United States Patent [19]
Kawamura et al.

[11] Patent Number: 5,524,087
[45] Date of Patent: Jun. 4, 1996

[54] METHOD OF FORMING A SIGNAL WAVE FROM FIRST AND SECOND WAVEFORM DATA

[75] Inventors: Masanobu Kawamura, Kodaira; Hiroyuki Kida, Kokubunji; Seiji Kamada, Hitachi; Toshiyuki Tojo, Higashimurayama; Takeshi Ohkubo, Oomiya; Hiroyuki Matsuura, Sugito-machi; Naoki Yashiki; Nobuo Shibasaki, both of Kodaira, all of Japan

[73] Assignee: Hitachi, Ltd., Tokyo, Japan

[21] Appl. No.: 367,596

[22] Filed: Jan. 3, 1995

Related U.S. Application Data

[63] Continuation of Ser. No. 80,803, Jun. 21, 1993, Pat. No. 5,418,734.

[30] Foreign Application Priority Data

Jun. 30, 1992 [JP] Japan .................................. 4-172551
Jun. 11, 1993 [JP] Japan .................................. 5-140700

[51] Int. Cl.$^6$ ............................................. G06F 1/02
[52] U.S. Cl. .................................................. 364/721
[58] Field of Search ................................. 364/721, 720, 364/719, 718

[56] References Cited

U.S. PATENT DOCUMENTS

| | | | |
|---|---|---|---|
| 4,225,936 | 9/1980 | Lesche | 364/718 |
| 4,342,245 | 8/1982 | Gross | 364/718 |
| 4,827,442 | 5/1989 | Mehrgardt et al. | 364/721 |
| 5,034,477 | 7/1991 | Chen et al. | 364/721 |
| 5,220,523 | 6/1993 | Yoshida et al. | 364/718 |
| 5,258,937 | 11/1993 | Blackmon | 364/718 |

FOREIGN PATENT DOCUMENTS

| | | |
|---|---|---|
| 57-69904 | 4/1982 | Japan . |
| 61-108218 | 5/1986 | Japan . |
| 63-237248 | 10/1988 | Japan . |
| 1-218208 | 8/1989 | Japan . |
| 1-238264 | 9/1989 | Japan . |
| 3-65059 | 3/1991 | Japan . |

OTHER PUBLICATIONS

"Tone Generator S–7116A", *Electronic Components*, Seiko Instruments, Inc. pp. 1–6.
Travis, "Incremental Lookup Tables Reduce ROM Size", *The Electronic Engineer*, v. 31, No. 3, Mar. 1972, pp. 49–50.
Cukier, "Programmable Digital Frequency Synthesizer", *IBM Technical Disclosure Bulletin*, V. 24, No. 1B, Jun. 1981, pp. 512–513.

*Primary Examiner*—David H. Malzahn
*Attorney, Agent, or Firm*—Fay, Sharpe, Beall, Fagan, Minnich & McKee

[57] ABSTRACT

A variable wave forming circuit is provided which produces signals of various waveforms (e.g., sine, triangular or trapezoidal waves) and various frequencies. A random access memory (memory means) 121 to store wave formation information on waveform is provided. According to the wave formation information stored in the memory means, the updating or keeping of a digital value in an increment/decrement circuit 123 is controlled and the digital value is digital/analog-converted by a digital/analog (D/A) conversion circuit 124, which is controlled by a digital value control means that includes the increment/decrement circuit 123. By writing appropriate wave formation information into the memory means, it is possible to produce signals of desired waveforms.

8 Claims, 13 Drawing Sheets

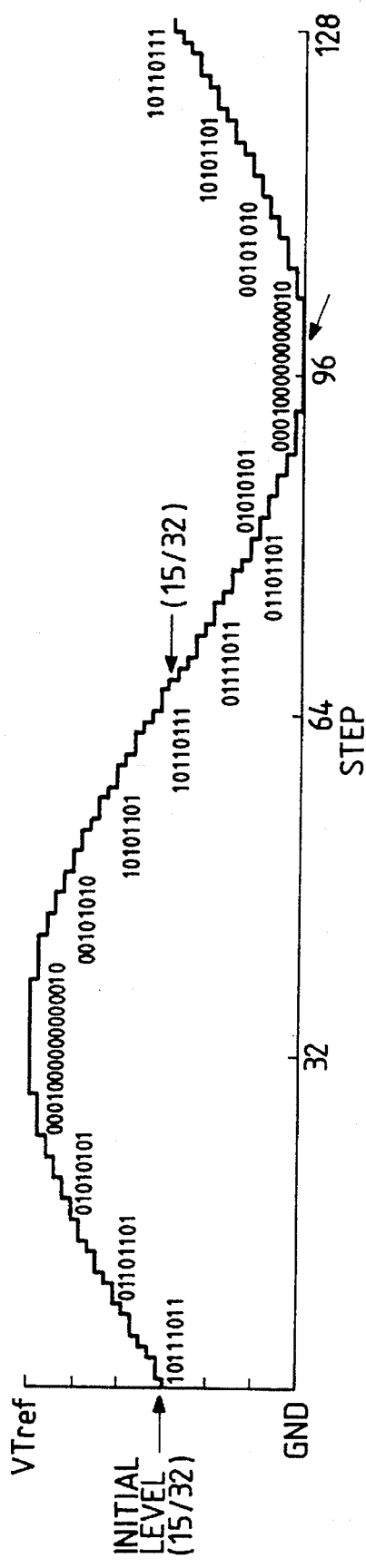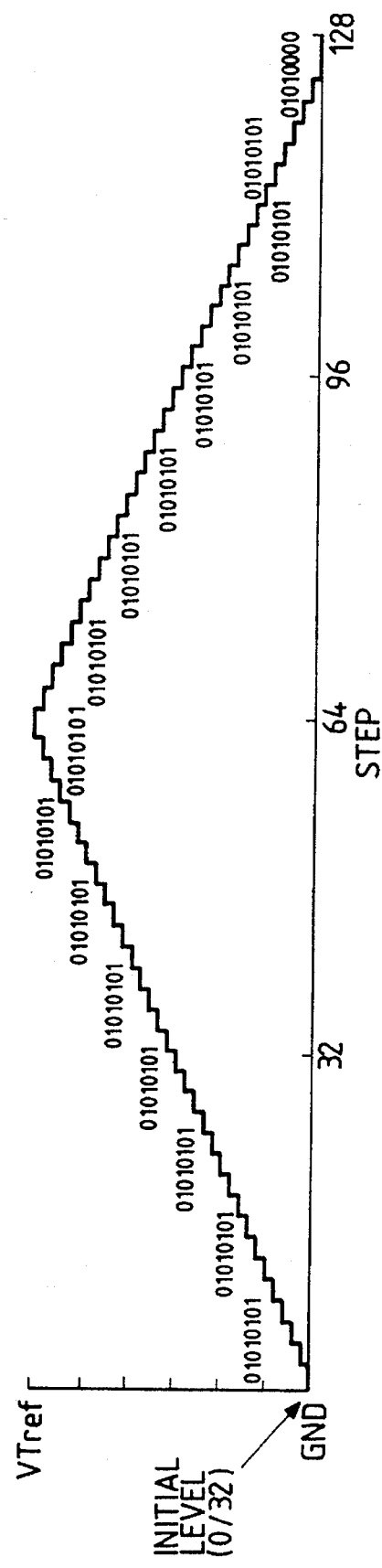

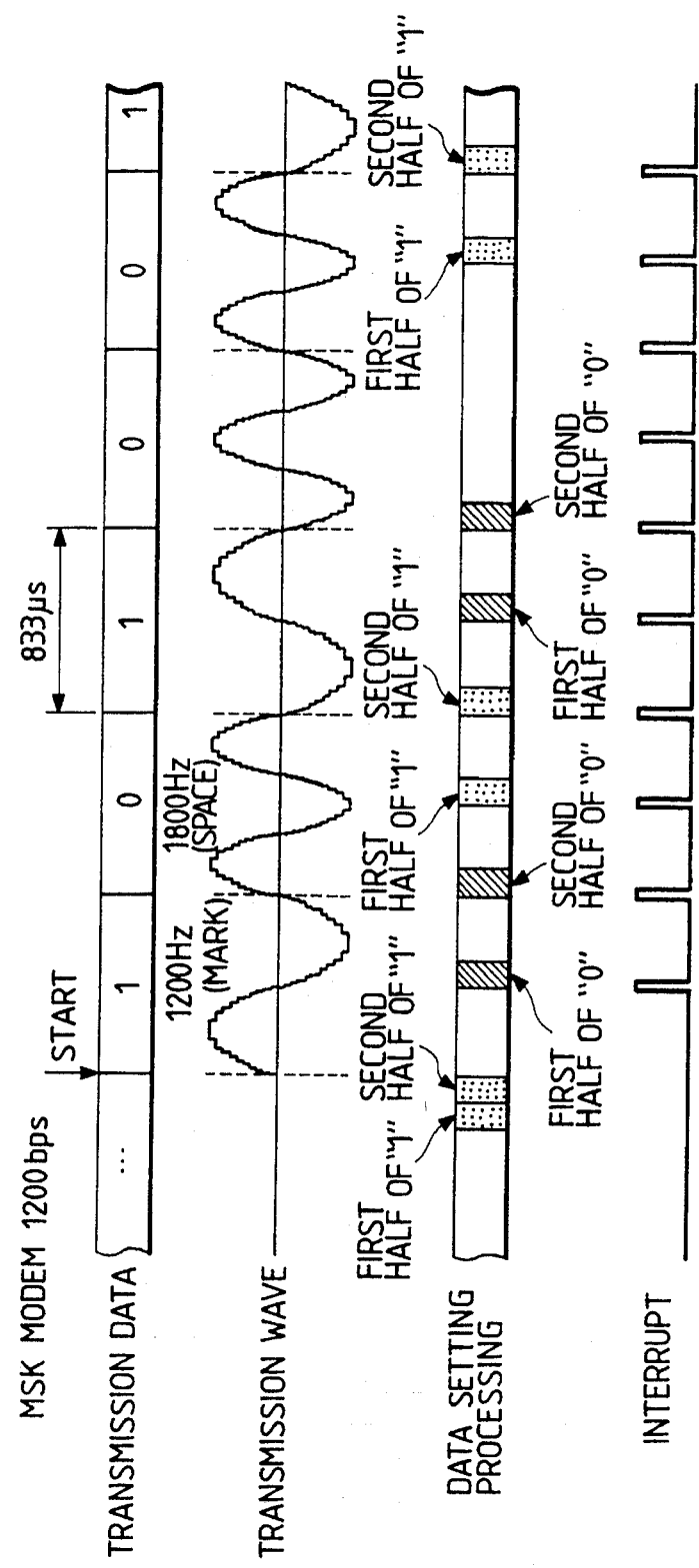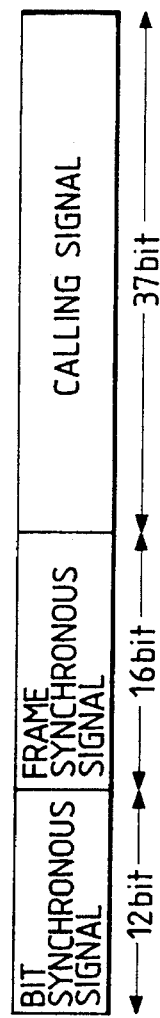

FIG. 12

TONE CONTROL REGISTER

| BIT: | 7 | 6 | 5 | 4 | 3 | 2 | 1 | 0 |
|---|---|---|---|---|---|---|---|---|
|  | DAOE | MTEN | DIR | — | FR1 | FR0 | FT1 | FT0 |
| INITIAL VALUE: | 0 | 0 | 0 | 1 | 0 | 0 | 0 | 0 |
| R/W: | R/W | R/W | R/W | — | R/W | R/W | R/W | R/W |

FIG. 13

FRAME REGISTER (FRMR)

| BIT: | 7 | 6 | 5 | 4 | 3 | 2 | 1 | 0 |
|---|---|---|---|---|---|---|---|---|
|  | FRM7 | FRM6 | FRM5 | FRM4 | FRM3 | FRM2 | FRM1 | FRM0 |
| INITIAL VALUE: | 0 | 0 | 0 | 0 | 0 | 0 | 0 | 0 |
| R/W: | R/W | R/W | R/W | R/W | R/W | R/W | R/W | R/W |

FIG. 14

MINOR ADJUSTMENT REGISTER (FTNR)

| BIT: | 7 | 6 | 5 | 4 | 3 | 2 | 1 | 0 |
|---|---|---|---|---|---|---|---|---|
|  | FTN7 | FTN6 | FTN5 | FTN4 | FTN3 | FTN2 | FTN1 | FTN0 |
| INITIAL VALUE: | 0 | 0 | 0 | 0 | 0 | 0 | 0 | 0 |
| R/W: | R/W | R/W | R/W | R/W | R/W | R/W | R/W | R/W |

FIG. 15

INITIAL LEVEL REGISTER (ITLR)

| BIT: | 7 | 6 | 5 | 4 | 3 | 2 | 1 | 0 |
|---|---|---|---|---|---|---|---|---|
|  | — | — | — | ITL4 | ITL3 | ITL2 | ITL1 | ITL0 |
| INITIAL VALUE: | 1 | 1 | 1 | 0 | 0 | 0 | 0 | 0 |
| R/W: | — | — | — | R/W | R/W | R/W | R/W | R/W |

FIG. 16

VALID BIT LENGTH REGISTER (EBLR)

| BIT: | 7 | 6 | 5 | 4 | 3 | 2 | 1 | 0 |
|---|---|---|---|---|---|---|---|---|
|  | — | EBL6 | EBL5 | EBL4 | EBL3 | EBL2 | EBL1 | EBL0 |
| INITIAL VALUE: | 1 | 0 | 0 | 0 | 0 | 0 | 0 | 0 |
| R/W: | — | R/W | R/W | R/W | R/W | R/W | R/W | R/W |

METHOD OF FORMING A SIGNAL WAVE FROM FIRST AND SECOND WAVEFORM DATA

This is a continuation application of U.S. Ser. No. 08/080,803, filed Jun. 21, 1993, now U.S. Pat. No. 5,418,734.

BACKGROUND OF THE INVENTION

The present invention relates to a technique effectively applied to a wave forming circuit that generates waveforms of any shape and frequency such as sine waves, triangular waves and trapezoidal waves, and more particularly to a technique effectively applied to a single-chip microcomputer having a tone signal wave forming circuit for communications control. Prior Art Among the tone signal wave forming circuits that produce artificial sine waves of a particular frequency, there is, for instance, a tone generator S-7116A of Seiko Instruments Inc. make. This tone generator comprises such hardware as a program counter, a Johnson counter and a resistor ladder network, and outputs an artificial sine wave tone produced by a 5-bit digital/analog (D/A) convertor. The tone generator has six program signal input terminals and is capable of outputting artificial sinusoidal waveforms with 57 kinds of frequency in the range of 67 Hz to 2975 Hz.

This kind of tone generator is introduced by a book "ELECTRONIC COMPONENTS" published by Seiko Instruments Inc. in the section of Tone Generator S-7116A.

There is an invention (Japanese Patent Laid-Open No. 237248/1988), which discloses a pilot signal generating apparatus that comprises a read-only memory (ROM) for storing each voltage level of staircase waves and a counter's count value to set a timing for switching the voltage levels of the staircase waves, and that, based on the information stored in the ROM, outputs signals of different frequencies.

Japanese Patent Laid-Open No. 69904/1982 discloses a tone signal generating circuit, which produces staircase-like sine waves synchronized with clock signals. The amount of change in the voltage level that forms the staircase-like sine waves is variably controlled.

Japanese Patent Laid-Open No. 108218/1986 discloses a signal generating apparatus, which produces waveforms of any shape by adding a circuit to an existing resistor ladder .which comprises a series of equal-resistance resistors. The circuit controls such that the voltages at coupled points between resistors in the resistor ladder are nonlinearly distributed.

Japanese Patent Laid-Open No. 218208/1989 describes a technique for producing artificial sine waves by switching the coupled points of the resistor ladder connected across two power supply terminals according to the counter value.

Japanese Patent Laid-Open No. 238264/1989 describes a tone generation apparatus which comprises: a tone data output means for outputting a specified tone data; a tone attenuation processing means for providing tone data with a specified amount of attenuation; and an attenuation data changing means for changing a specified amount of attenuation periodically.

Japanese Patent Laid-Open No. 65059/1991 describes AC-DC power convertor equipment which successively switches a series of DC power supplies to produce staircase waveform signals simulating sine waveforms.

SUMMARY OF THE INVENTION

The inventors of this invention studied a circuit configuration of a tone signal wave forming circuit to develop a single-chip microcomputer which incorporates a communications control tone signal wave forming circuit for controlling communications equipment such as radio devices.

Our studies have found the following problems. In a single-chip microcomputer that performs multiple controls, the number of external terminals that can be used on a semiconductor chip is limited so that it is not possible to allocate a large number of external terminals to the tone signal wave forming circuit. For this reason, it is difficult to mount the above-mentioned conventional wave forming circuit—which requires many external program terminals for setting the kind of a waveform to be produced —onto the single-chip microcomputer. Further, because the shape and frequency of the output waveforms are limited in the wave forming circuit, the microcomputer lacks versatility and expandability.

The object of this invention is to provide a wave forming circuit, which can control the shape of output waveforms (sine, triangle and trapezoidal waves, etc.) and produce waveforms of any frequency.

Another object of this invention is to provide a wave forming circuit, which can be incorporated into a single-chip microcomputer.

These and other objects and novel features of this invention will become apparent from the following description in this specification and the accompanying drawings.

The wave forming circuit according to this invention includes: a rewritable memory means for storing shape information off waveform signals to be output; a digital value control means to output digital values and variably control these digital values; and a digital/analog conversion circuit to convert the digital values output from the digital value control means into analog voltages that form the waveform signals. The digital value control means changes the digital values by calculation according to the shape information read out from the memory means.

Since the digital values output from the digital value control means are variably controlled by the shape information stored in the memory means, the shape of the waveform signal can be set to an arbitrary shape according to the shape information. As a result, the versatility of the wave forming circuit of this invention is enhanced.

To reduce the memory capacity of the memory means, the digital value control means is preferably configured as follows.

That is, the digital value control means comprises: a first register for storing the digital value (digital data made up of two or more bits); an addition means (increment circuit) for increasing the digital value stored in the first register according to the shape information (consisting of a smaller number of bits than that of the digital data); a subtraction means (decrement circuit) for reducing the digital value stored in the first register according to the shape information; and a selection means coupled between each output of the addition means and the subtraction means and the first register and adapted for selectively supplying to the input of the first register one of the output data from the addition means and the subtraction means. In this case, since the addition means and the subtraction means are controlled by the shape information which has a smaller number of bits than the digital value, it is possible to reduce the memory capacity of the memory means.

Further, the above wave forming circuit is formed in a single-chip microcomputer that contains a central processing unit (CPU), with the shape information in the memory means of the wave forming circuit capable of being updated or written over by the CPU. That is, the memory means in the wave forming circuit are accessible by the CPU via address bus, data bus and control bus.

Therefore, by simply changing or writing the shape information in the memory means in the wave forming circuit by the CPU, it is possible to have a waveform signal of any shape and frequency output from the single-chip microcomputer. In other words, a waveform signal of any shape and frequency can be output from the single-chip microcomputer without having to provide a dedicated terminal for waveform control to the single-chip microcomputer.

BRIEF DESCRIPTION OF THE DRAWINGS

FIG. 6 is a waveform diagram showing an example output waveform (sine wave) in the embodiment of the invention;

FIG. 7 is a waveform diagram showing an example output waveform (triangle wave) in the embodiment of the invention;

FIG. 9(a) is a waveform diagram showing an example of output waveform control in another embodiment of the invention;

FIG. 9(b) is an explanatory diagram showing an example of frame configuration of a signal transmitted according to MSK modem standard;

FIG. 12 is a diagram showing an example configuration of a tone control register;

FIG. 13 is a diagram showing an example configuration of a frame register;

FIG. 14 is a diagram showing an example configuration of a fine adjustment register;

FIG. 15 is a diagram showing an example configuration of an initial level register;

FIG. 16 is a diagram showing an example configuration of a valid bit length register;

DESCRIPTION OF THE PREFERRED EMBODIMENT

A preferred embodiment of the present invention will be described by referring to the attached drawings.

Figure 1:
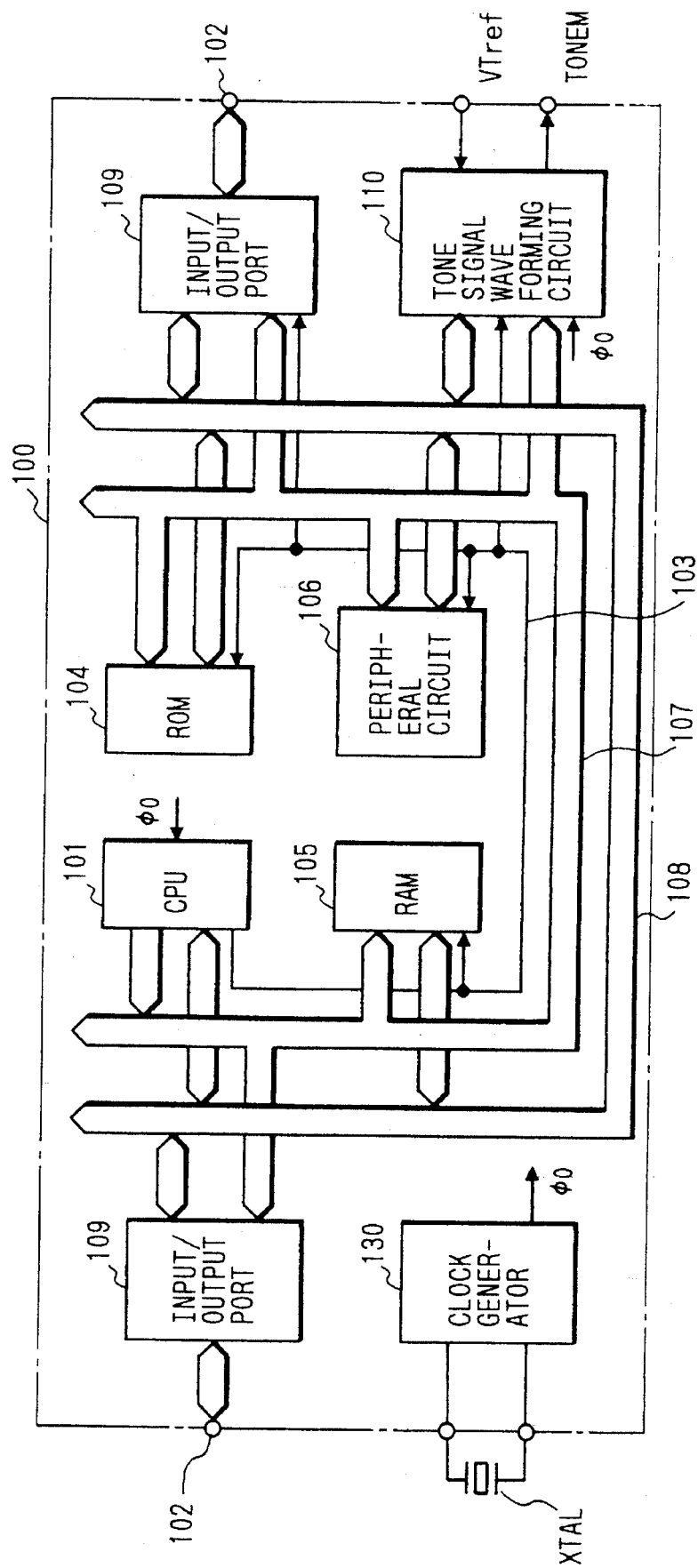
FIG. 1 is a block diagram showing one example of a single-chip microcomputer applying the present invention.

FIG. 1 is a block diagram showing an example of overall system configuration of a single-chip microcomputer that incorporates a tone signal wave forming circuit using a wave forming circuit of this invention and other peripheral functions. The single-chip microcomputer 100 contained in a one-dot line in the figure may be formed on a semiconductor chip such as a single crystal silicon substrate.

In FIG. 1, the single-chip microcomputer 100 comprises: a central processing unit (CPU) 101; a read-only memory (ROM) 104 to store programs for operating the CPU 101; a random access memory (RAM) 105 used as a work space by the CPU; a peripheral circuit 106 such as timer and serial communication interface; a tone signal wave forming circuit 110; an input/output port 109; and a clock generator 130. The CPU 101 is interconnected with these circuit blocks 104, 105, 106, 109, 110 except for the clock generator 130 through an address bus 107 and a data bus 108.

The input/output port 109 is provided for transmission and reception of data between the single-chip microcomputer 100 and external devices connected to the single-chip microcomputer 100 through a plurality of external terminals 102. The tone signal wave forming circuit 110 outputs a tone signal wave from the single-chip microcomputer 100 through an external tone output terminal TONEM.

Control signals such as read/write control signals are fed from the CPU 101 to the ROM 104, RAM 105, peripheral circuit 106 and tone signal wave forming circuit 110 via control signal lines (control bus) 103.

The single-chip microcomputer 100 incorporates the clock generator 130 that generates a reference clock signal 40, which serves as a reference for the operation timing of the CPU 101, the tone signal wave forming circuit 110 and others. The clock generator 130 is connected through external terminals marked "O" to an oscillator XTAL such as a quartz oscillator or a ceramic oscillator and produces the reference clock signal $\phi_0$.

Figure 2:
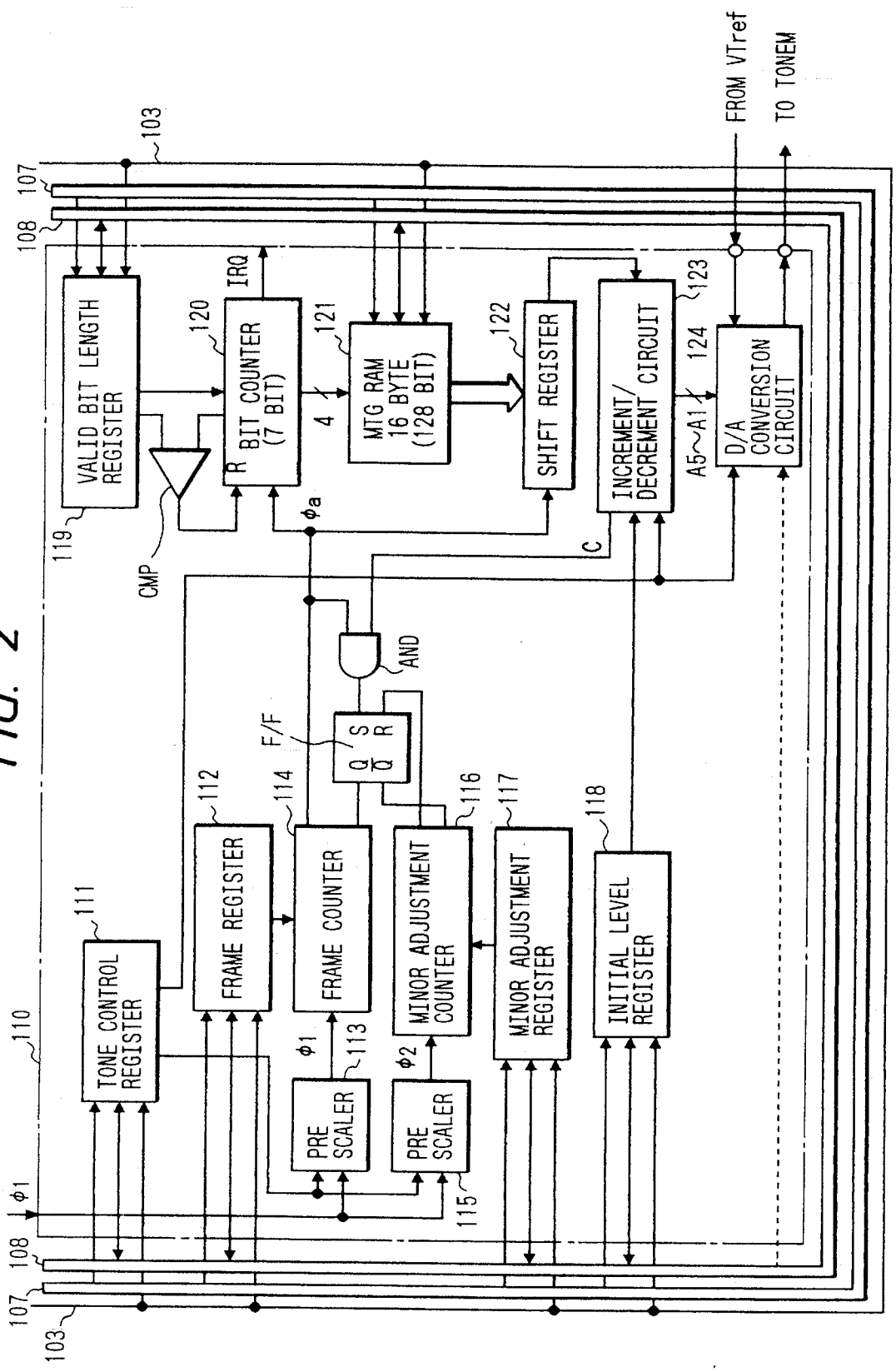
FIG. 2 is a block diagram showing the configuration of one embodiment of a tone signal wave forming circuit that applies the present invention.

FIG. 2 shows the configuration of one embodiment of the tone signal wave forming circuit 110. The tone signal wave forming circuit 110 according to this invention does not mean a circuit which can output a plurality of tone signals simultaneously. That is, while the tone signal wave forming circuit can output multiple kinds of tone signal, the number of tone signal kinds being output at any given time is only one kind. The tone signal wave forming circuit 110 of this embodiment comprises: a tone control register 111, a frame register 112, prescalers 113, 115, a frame counter 114, a minor adjustment counter 116, a minor adjustment register 117, an initial level register 118, a valid bit length register 119, a bit counter 120, a random access memory (abbreviated MTGRAM) 121 to store the wave formation information of a waveform to be output, a shift register 122, an increment/decrement circuit 123 as a digital calculation means, a digital/analog (D/A or D-A) conversion circuit 124, a comparator circuit CMP, a set-reset flip-flop F/F, and an AND circuit AND. The shift register 122 and the increment/ decrement circuit 123 are regarded as digital value control means.

The prescalers 113, 115 are supplied the reference clock signal $\phi_0$ output from the clock generator 130. The registers 111, 112, 117, 119 and the MTGRAM 121 have their internal information set or written over by the CPU 101 through the address bus 107, data bus 108 and control bus 103. That is, these circuits 111, 112, 117, 119, 121 are each assigned particular addresses in the address space in the CPU 101, and can be selectively accessed according to the address signal output from the CPU 101.

Of the above registers, the tone control register 111 includes control bits which are set with the following control information. That is, the tone control register 111 includes a control bit for the control information that specifies whether or not to cause the D/A conversion circuit 124 to output a tone signal from the external tone output terminal TONEM, a control bit for the control information that specifies whether or not to activate the tone signal wave forming circuit 110, a control bit for the control information that specifies the level change direction at the starting of the tone signal wave forming circuit 110, i.e. the up or down direction of the increment/decrement circuit 123, and a plurality of control bits for the control information that specifies the clock output from the prescalers 113, 115 for the frame counter 114 and the minor adjustment counter 116, i.e. how many times the frequency of the reference clock signal $\phi_0$ shall be divided before being sent to the frame counter 114 and the minor adjustment counter 116 in the next stage. The status of each control bit is determined by the CPU 101. In other words:, the clear state "0" or set state "1" of these control bits is set by the CPU 101.

The frame register 112 is set, by the CPU 101, with a count value that is to be counted by the frame counter 114. The minor adjustment register 117 is set, by the CPU 101, with a count value that is to be counted by the minor adjustment counter 116. Further, the initial level register 118 is set, by the CPU 101, with an initial output level of the tone signal at the tone output starting. The value set in the initial level register 118 is supplied through the increment/decrement circuit 123 to the D/A conversion circuit 124 where it is digital/analog-converted before being output as the initial voltage from the external tone output terminal TONEM when the tone signal wave forming circuit 110 starts to operate.

The MTGRAM 121 is a memory means to store a bit pattern (for example, wave formation information on one-cycle waveform), which is the shape information to control changes in the output waveform of a tone signal. In this embodiment, the MTGRAM 121 is so configured as to have a capacity for holding up to 128 bits, i.e. a 16-byte bit pattern. That is, the MTGRAM 121 includes a memory cell to and from which 128 bits can be written and read. In the address space of the CPU, the bit pattern of each byte of the MTGRAM 121 is assigned an address; hence, the MTGRAM 121 as a whole is assigned 16 addresses.

As mentioned above, the MTGRAM 121 is specifiable by an address in the address space of the CPU 101 and the bit pattern is written into the corresponding memory location by the CPU 101.

The bit pattern is based on the output waveform data stored in the ROM 104 shown in FIG. 1. Therefore, when writing a bit pattern into the MTGRAM 121, the CPU 101 operates as follows. First, the CPU 101 outputs onto the address bus 107 an address signal corresponding to the first 8-bit data of the output waveform data (128 bits, for example) of the ROM 104 while at the same time putting a read signal on the control bus 103. As a result, the ROM 104 outputs the corresponding 8-bit data to the data bus 108. Next, the CPU 101 outputs onto the address bus 107 an address signal corresponding to the start address of the MTGRAM 121 and at the same time outputs a write signal onto the control bus 103. As a result, the start address of the MTGRAM 121 is accessed by the CPU 101, which writes the 8-bit data read from the ROM 104 into the start address of the MTGRAM 121. This process is repeated until all the output waveform data in the ROM 104 is written into the MTGRAM 121. The output waveform data in the ROM 104 may be data for one cycle. For example, where output waveform data for a plurality of output waveforms is stored in the ROM 104, output waveform data corresponding to a desired output waveform can be written into the MTGRAM 121.

The bit pattern set in the MTGRAM 121 is read out by the bit counter 120. That is, the MTGRAM 121 is also accessed by an address signal output from the bit counter 120, an address generating circuit. The MTGRAM 121 outputs a 1-byte bit pattern according to the address signal output from the bit counter 120, and the 1-byte bit pattern thus read out is transferred to the shift register 122. The bit counter 120 receives a pulse signal $\phi_a$, which is output from the frame counter 114 each time the frame counter 114 counts up the count value represented by the total count value information held in the frame register 112, and thereby counts the number of pulse signals $\phi_a$ received. Each time the count value of the bit counter 120 has changed eight times, the bit counter 120 outputs a part of the count value at that time as an address signal to the MTGRAM 121, which will output the bit pattern 8 bits at a time according to the address signal from the bit counter 120. That is, the bit counter 120 works as an up counter which, each time it receives the pulse signal $\phi_a$, increments the count value information. Therefore, the pulse signal $\phi_a$ is regarded as a count-up signal of the bit counter.

In more concrete terms, the bit counter 120 is made up of seven bits, of which higher-order four bits are fed as an address signal to the MTGRAM 121. The high-order four-bit data of the bit counter 120 is updated, for example, from "0000" to "0001" to "0010" ... to "1111" each time the counter counts the pulse signal $\phi_a$ eight times. The frame counter 114 is a down counter, which is set with the total count value information as the count value information when the count value information in the frame counter 114 agrees with the total count value information in the frame register 112.

The valid bit length register 119 is set with the length of the valid bit pattern of 128-bit data in the MTGRAM 121. That is, when a part of the bit pattern of the MTGRAM 121 is used for the shape control of waveform, or when the bit pattern of waveform for one cycle is less than 128 bits, the range of data in the MTGRAM 121 to be used is specified by a value set in the valid bit length register 119. Since the bit pattern is stored beginning with the start address of the MTGRAM 121, the range of data to be used is the length from the start address.

A comparator circuit CMP is provided which compares the count value of the bit counter 120 with the setting of the valid bit length register 119. The bit counter 120 is reset by an agreement detection signal from the comparator circuit CMP. That is, each time the bit counter 120 counts up to the set value of the valid bit length register 119, it starts over counting up from "0" again.

Although the bit counter 120 was described in the above to be formed of an up counter, it may be formed of a down counter. In this case, however, attention must be paid to the fact that the waveform shape information does not begin to be stored from the start address of the MTGRAM 121.

The shift register 122 that holds the bit pattern read from the MTGRAM 121 is made up of eight bits. When all the 8-bit data is shifted, the shift register 122 takes in the next 8-bit data from the MTGRAM 121.

The MTGRAM 121 has a decoder DEC to decode an address signal output from the bit counter 120. Each time the bit counter 120 counts eight pulse signals $\phi_a$ from the frame counter 114, the shape information in the eight memory cells selected by the decoder DEC is supplied to the shift register 122.

That is, every time the bit counter 120 counts the pulse signal $\phi_a$ from the frame counter 114 eight times, 1-byte data is read from the MTGRAM 121 into the shift register 122. The pulse signal $\phi_a$ from the frame counter 114 is also fed to the shift register 122. Each time the pulse signal $\phi_a$ is supplied, the shift register 122 shifts the 8-bit data one bit at a time to output the data to the increment/decrement circuit 123. That is, the pulse signal $\phi_a$ is regarded as a shift clock for the shift register 122.

The increment/decrement circuit 123 performs either an increment operation, a decrement operation on the digital value, or a continued holding according to the state "0" or "1" of the bit pattern supplied from the shift register 122. After these operations, the increment/decrement circuit 123 feeds the digital data to the D/A conversion circuit 124, where it is converted into an analog signal before being output from the external tone output terminal TONEM.

Figure 5:
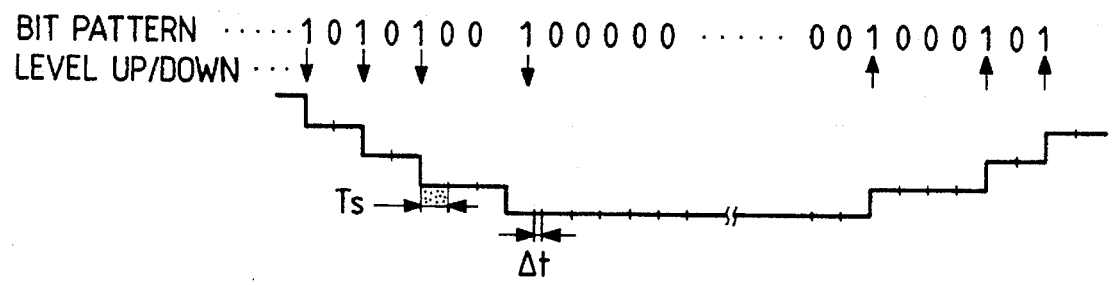
FIG. 5 is a waveform diagram showing a partly enlarged output waveform of FIG. 4.

The frame counter 114 counts down the clock signal $\phi_1$—which was obtained by dividing the reference clock signal $\phi_0$ by the prescaler 113—from the value represented by the total count value information to the "0" value. By so doing, the frame counter 114 gives an operation timing signal for the shift register 122, i.e. a time duration Ts for one step of the output staircase waveform, as shown in FIG. 5.

The pulse signal $\phi_a$—which is output when the frame counter 114 has counted up to the value represented by the total count value information set in the frame register 112—is supplied to the bit counter 120. When the bit counter 120 counts up from the value "0000000" up to the value set in the valid bit length register 119, the 8-bit wave formation information is read out from the start address of the MTGRAM 121 into the shift register 122. Although the frame counter 114 was described to be formed of a down counter, it may be formed of an up counter. In this case, however, it is noted that a compare circuit is needed to compare the total count value information in the frame register 112 and the count value information in the frame counter 114.

The minor adjustment counter 116 counts the clock signal $\phi_2$—which was obtained by dividing the reference clock signal $\phi_0$ by the prescaler 115—up to the value represented by the total count value information set in the minor adjustment register 117, in order to give a minor adjustment time $\Delta t$ (see FIG. 5), which extends the operation of the shift register 122, i.e. the cycle of the output waveform.

The frame counter 114 and the minor adjustment counter 116 operate complementary to each other. This operation is explained in detail. There is an AND circuit AND1, which has an input for receiving a control signal C, which is output from the increment/decrement circuit 123 when the digital value held in the increment/decrement circuit 123 is maximum or minimum, and an input for receiving the pulse signal $\phi_a$ output from the frame counter 114. The set-reset flip-flop F/F is provided, which has a set terminal S for receiving an output signal from the AND circuit AND1, a reset terminal R for receiving from the minor adjustment counter 116 a signal indicating that the minor adjustment counter 116 has finished the count operation, an output terminal Q for outputting a signal that will cause all the bits representing the count value of the frame counter 114 to become "0" (cleared state), and an inverted output terminal $\overline{Q}$ for outputting a signal which will cause all the bits representing the count value of the minor adjustment counter 116 to become "0" (cleared state) and whose phase is inverted to the signal output from the output terminal Q. This results in a control such that when the digital value held in the increment/decrement circuit 123 becomes maximum or minimum and the pulse signal $\phi_a$ is "1," the operation of the frame counter 114 is stopped and instead the minor adjustment counter 116 starts to operate. When the minor adjustment counter 116 has counted down from the value represented by the total count value information set in the minor adjustment register 117 to all "0," the operation of the minor adjustment counter 116 stops and instead the frame counter 114 begins to operate. That is, when the frame counter 114 is in operation, the minor adjustment counter 116 is stopped; and when the minor adjustment counter 116 is operating, the frame counter 114 is stopped.

It is when the count value of the increment/decrement circuit 123 is maximum (all "1") or minimum (all "0") that the minor adjustment counter 116 operates.

In this embodiment, when the count value of the increment/decrement circuit 123 is maximum or minimum, the control signal S fed from the increment/decrement circuit 123 to the frame counter 114 and the minor adjustment counter 116 is changed, switching the operation of the frame counter 114 and the minor adjustment counter 116. However, the configuration is not limited to the above and may be otherwise. For example, a register to control the switching over to the minor adjustment operation may be provided in the increment/decrement circuit 123 and a specified value be set in the register so that the minor adjustment operation is initiated when the digital value in the increment/decrement circuit 123 is equal to the value set in the register.

Next, the configuration of each register in the tone signal wave forming circuit 110 will be described in detail.

FIG. 12 shows one example configuration of the tone control register 111.

As shown in the figure, the tone control register 111 consists of eight bits, of which a DAOE bit is a data output enable bit that determines whether to output a signal waveform from the D/A conversion circuit 124.

A bit designated MTEN is a tone generator enable bit that determines whether to activate the tone signal wave forming circuit 110.

A DIR bit is a level change direction specification bit, which determines the direction in which the value of the increment/decrement circuit 123 will change when the tone signal wave forming circuit 110 starts.

FR1 and FR0 bits determine a dividing factor for the prescaler 113. FT1 and FT0 are bits that determine a dividing factor for the prescaler 115. The dividing factor for the prescaler 113 may be set, for example, to 1/8 according to the values set in the FR1 and FR0, and that for the prescaler 115 to ½.

The value "0" or "1" written in the initial value column is a data value written before the tone signal wave forming circuit 110 is initialized. In the R/W columns, those bits written as R/W mean that data in these bits can be changed as by reading and writing.

The same meanings of the initial value and R/W column also apply to the registers shown in FIG. 13 through FIG. 16 described later.

FIG. 13 shows an example configuration of the frame register 112 of FIG. 2. The frame register 112 has eight valid bits FRM7 to FRM0, which determine the count value of the frame counter 114.

FIG. 14 shows an example configuration of the minor adjustment register 117. The minor adjustment register 117 has eight valid bits FTN7 to FTN0, which determine the count value of the minor adjustment counter 116.

FIG. 15 shows an example configuration of the initial level register 118 of FIG. 2. The initial level register 118 has eight bits, of which ITL4 to ITL0 are valid bits. These valid bits determine the voltage value to be output from the external tone output terminal TONEM when the tone signal wave forming circuit 110 starts its operation.

FIG. 16 shows an example configuration of the valid bit length register 119 of FIG. 2. The valid bit length register 119 has eight bits, of which EBL6 to EBL0 are valid bits. The valid bits determine how much bit data of the total capacity (128 bits) of the MTGRAM 121 will be used, in other words, how many steps are required for one cycle of the waveform.

Although the above registers were all described to be formed of eight bits, various modifications may be made. For example, where it is desired to produce more precise or more complex waveform, the capacity of the MTGRAM 121 may be increased and the number of bits in the valid bit length register 119 increased. It is also possible to form the shift register in a 16-bit configuration so that the data can be transferred from the MTGRAM 121 16 bits at a time.

Figure 17:
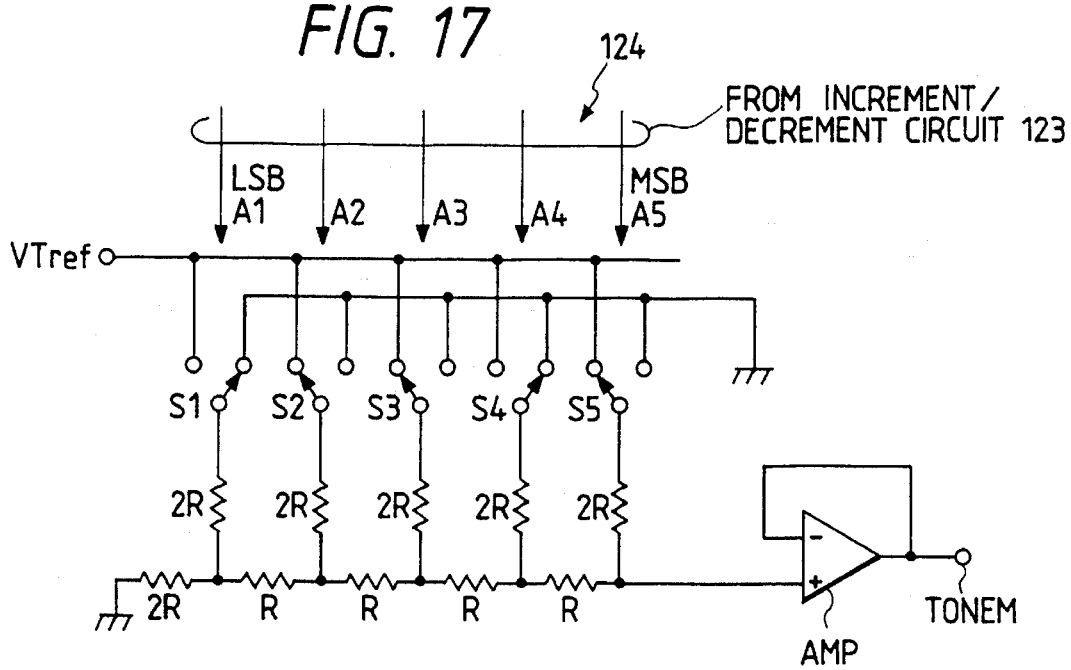
FIG. 17 is a circuitry showing an example circuit of a digital/analog conversion circuit.

FIG. 17 shows a concrete circuit example of the D/A conversion circuit 124 of FIG. 2.

This D/A conversion circuit 124 is a known R-2R type D/A conversion circuit using a resistor ladder. The D/A conversion circuit 124 of FIG. 17 comprises: resistors R and 2R (resistance of 2R is two times that of R); switches S1 to S5 which are connectable at one end either to a reference voltage VTref or a ground potential and at the other end to specified coupling points of the resistor ladder; and a differential amplifier circuit AMP.

The switches S1–S5 are controlled by 5-bit digital signals A1–A5 output from the increment/decrement circuit 123. As a result, $2^5=32$ steps of voltage level can be output from the tone signal external tone output terminal TONEM through the differential amplifier circuit AMP.

Although in FIG. 17 the digital/analog conversion circuit 124 is formed so that a specified voltage produced by the resistor ladder is output through the differential amplifier circuit AMP from the external tone output terminal TONEM, the circuit configuration may be otherwise. For instance, without providing the differential amplifier circuit AMP, the D/A conversion circuit may be formed.

Figure 22:
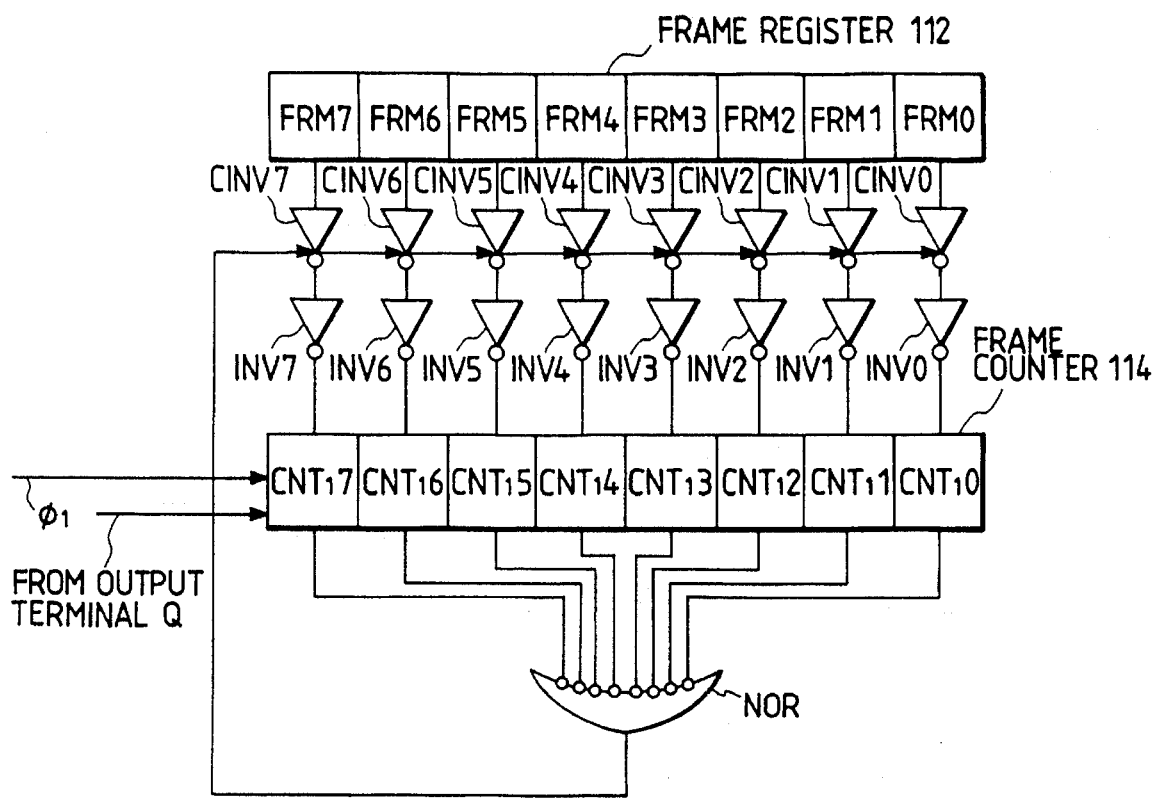
FIG. 22 is a detailed block diagram of a frame register and a frame counter.

FIG. 22 shows a detailed block diagram of the frame register 112 and the frame counter 114. Explanation of operation of the frame counter 114 follows. 8-bit registers $CNT_1 0$–$CNT_1 7$, data holding means, that form the frame counter 114 are so constructed that their value decrements by "1" each time the signal $\phi_1$ is input. When the registers $CNT_1 0$–$CNT_1 7$ are all "0," a NOR circuit outputs a signal representing the high level "1" to clocked inverter circuits CINV0–CINV7. In response to this signal, the clocked inverter circuits CINV0–CINV7 transfer the value representing the total count value information set in registers FRM0–FRM7 of the frame register 112 through invertor circuits INV0–INV7 to the registers $CNT_1 0$–$CNT_1 7$ that form the frame counter 114. The value representing the total count value information set in the registers $CNT_1 0$–$CNT_1 7$ is decremented by 1 each time the signal $\phi_1$ is entered.

The count down operation of the registers $CNT_1 0$–$CNT_1 7$ may be stopped by a high-level signal from the output terminal Q of the set reset flip-flop F/F and restarted in response to a low-level signal from the terminal.

Figure 23:
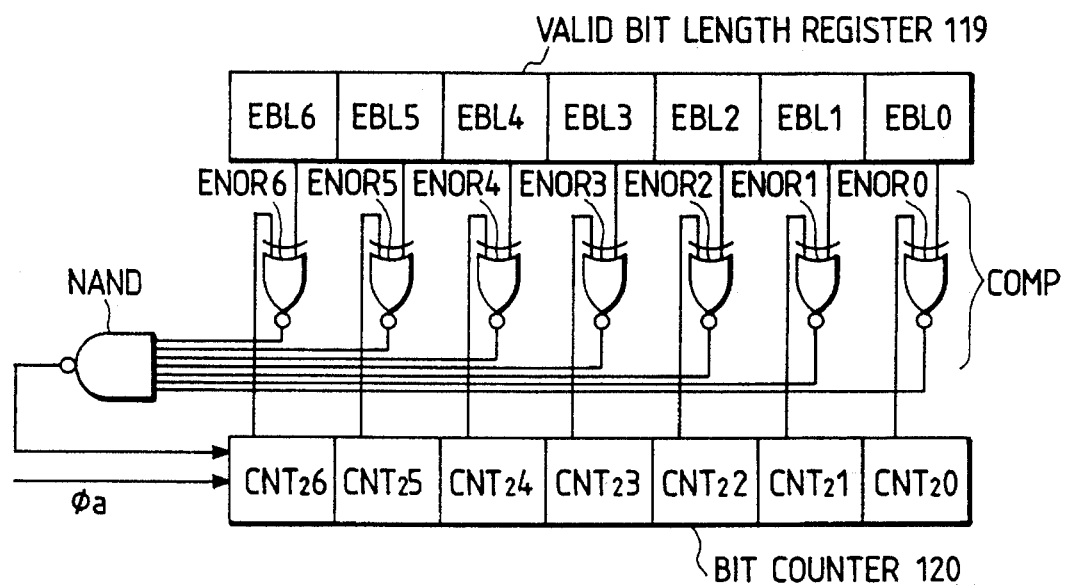
FIG. 23 is a detailed block diagram of a valid bit length register, a bit counter and a compare circuit.

FIG. 23 shows a detailed block diagram of the valid bit length register 119, the bit counter 120, and the compare circuit CMP.

The compare circuit CMP consists of Exclusive-OR circuits ENOR0–ENOR6 and a NAND circuit NAND. The valid bit length register 119 comprises 7-bit registers EBL0–EBL6 and stores the total count value information. The bit counter 120 is formed of 7-bit registers $CNT_2 0$–$CNT_2 6$, data holding means. The information stored in the registers $CNT_2 0$–$CNT_2 6$ is incremented by 1 each time the pulse signal $\phi_a$ is entered. The Exclusive-OR circuits ENOR0–ENOR6 are supplied information from the registers EBL0–EBL6 and the registers $CNT_2 0$–$CNT_2 6$ and their outputs are fed to the NAND circuit NAND. The output of the NAND circuit NAND is given to the bit counter 120.

The operation of the valid bit length register 119, the bit counter 120 and the compare circuit CMP will be explained below. The information stored in the registers $CNT_2 0$–$CNT_2 6$ is incremented by 1 each time the pulse signal $\phi_a$ is entered and when that value reaches the total count value information stored in the registers EBL0–EBL6, it is cleared to "0000000." The value is again incremented in response to the input of the pulse signal $\phi_a$, repeating the above-mentioned series of operations.

While FIG. 17 shows a digital/analog conversion circuit 124 that can output $2^5$ steps of voltage level which are selected by 5-bit signals A1–A5 supplied from the increment/decrement circuit 123, the D/A conversion circuit 124 may be formed otherwise. For example, the D/A conversion circuit may be configured so as to be able to output $2^8$ steps of voltage level selectable by 8-bit signals supplied from the increment/decrement circuit 123.

Figure 19:
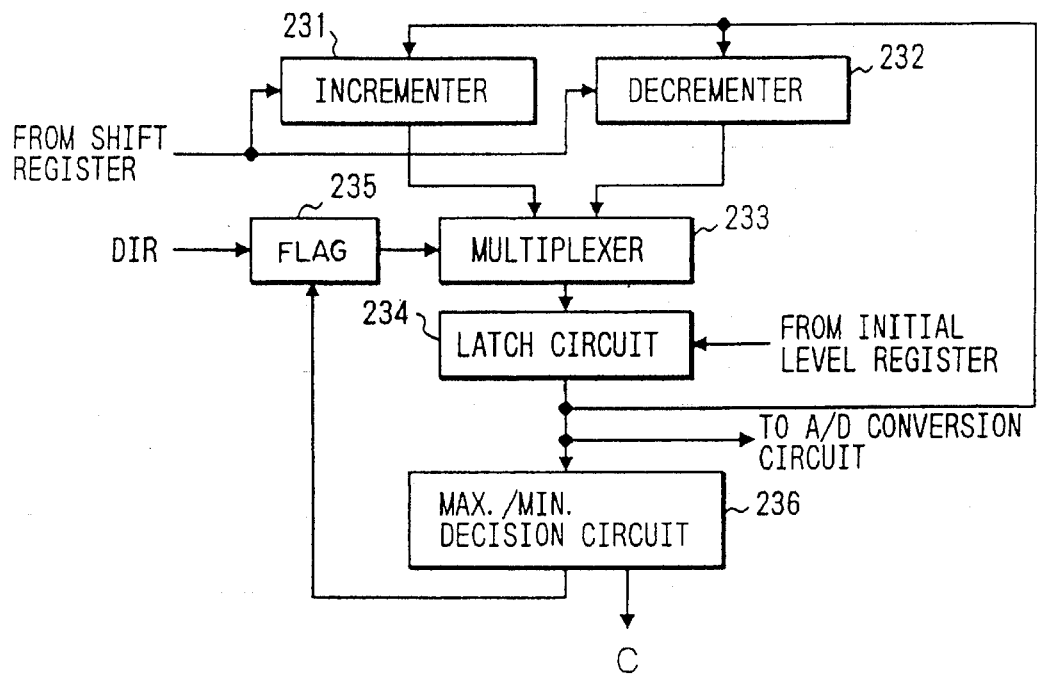
FIG. 19 is a block diagram showing the configuration of an increment/decrement circuit.

FIG. 19 shows an example configuration of the increment/decrement circuit 123 of FIG. 2.

As shown in the figure, the increment/decrement circuit 123 of this invention has an incrementer 231 and a decrementer 232, either of whose count values is selected by a multiplexer 233 and sent to a latch circuit 234. The latch circuit 234 is set with the initial level from the initial level-register 118. The value held in the latch circuit 234 is returned to the incrementer 231 and the decrementer 232 where it is incremented or decremented or left unupdated according to the information from the shift register 122. The result of the incrementer or the decrementer is sent through the multiplexer 233 to the latch circuit 234 where it is held. The multiplexer 233 is controlled by an up/down flag 235 that specifies the increment/decrement direction.

The value held in the latch circuit 234 is sent to the D/A conversion circuit 124 where it is D/A-converted and also to a maximum/minimum decision circuit 236 to determine if the calculated value has reached the maximum or minimum value. The maximum/minimum decision circuit 236 may, for example, be formed of a decoder and, when it detects that the value has reached the maximum or minimum value, produces a signal to set or reset the up/down flag 235.

When the up/down flag 235 is set, the multiplexer 233 selects the value of the incrementer 231 and feeds it to the latch circuit 234. When the up/down flag 235 is reset, the multiplexer 233 selects the value of the decrementer 232 and feeds it to the latch circuit 234. The up/down flag 235 at the start of its operation is set or reset according to the contents of the level change direction specification bit DIR in the tone control register 111.

Figure 3:
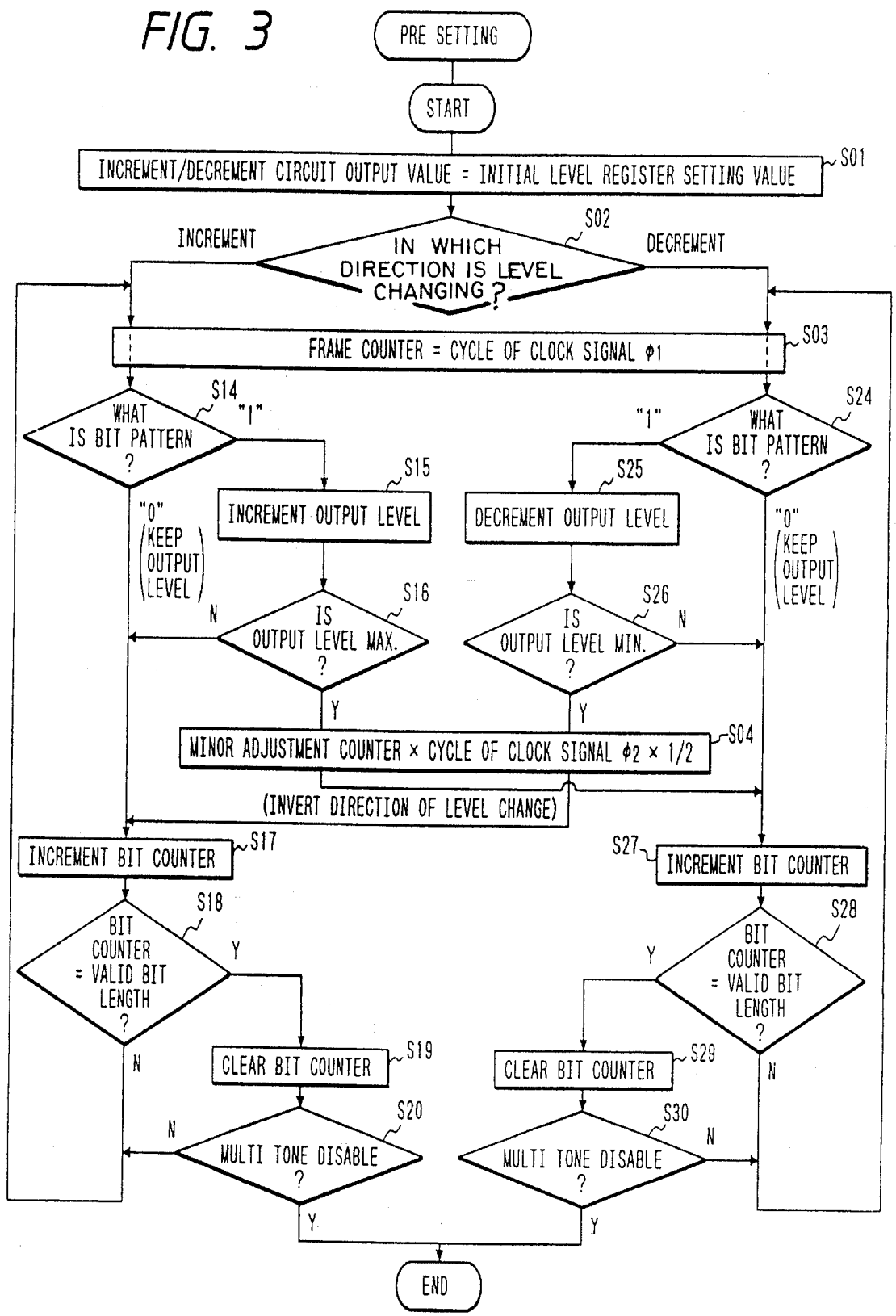
FIG. 3 is a flowchart showing the operation procedure of the tone signal wave forming circuit in the embodiment of the invention.

Next, the operation of the tone signal wave forming circuit 110 will be explained in detail by referring to the flowchart of FIG. 3.

When the CPU 101 sets the tone output control bit DAOE and the tone generator enable bit MTEN in the tone control register 111 to "1," the tone signal waveform is ready to be output from the external tone output terminal TONEM. At this time, the frame counter 114, the minor adjustment counter 116, the bit counter 120, the increment/decrement circuit 123 and the D/A conversion circuit 124 are ready to be started. The output of the tone signal waveform is stopped by the CPU 101 setting the operation enable bit to "0."

As the operation of the tone signal wave forming circuit 110 is started, what is done first is that the value set in the initial level register 118 is sent to the latch circuit 234 of the increment/decrement circuit 123 so that the output value (digital value) of the increment/decrement circuit 123 to be supplied to the D/A conversion circuit 124 at the start of operation will be the value set in the initial level register 118. This digital value is D/A-converted by the D/A conversion circuit 124 and a specified voltage corresponding to the value set in the initial level register 118 is output as the initial level (see FIG. 4) from the external tone output terminal TONEM (step S01).

Next, the level change direction is determined according to the contents of the level change direction specification bit in the tone control register 111 (step S02). Then, for a duration of one step (frame register value×clock signal $\phi_1$ period), the output value (digital value) of the increment/decrement circuit 123 is fed to the D/A conversion circuit 124 (step S03) where the digital value is converted into an analog signal, which is output from the external tone output terminal TONEM.

Then, a check is made of the bit pattern read from the MTGRAM 121 into the shift register 122 to see if there is any change in the output value of the increment/decrement circuit 123, i.e. any level change in the output waveform (step S14, S24). When the bit pattern is "1" as shown in FIG. 5, the output value (digital value) of the increment/decrement circuit 123 is incremented or decremented (step S15, S25). On the other hand, when the bit pattern is "0," the output level is left as is (remains the same). After the output value (digital value) of the increment/decrement circuit 123 has been incremented or decremented, it is checked whether the output value of the increment/decrement circuit 123 has reached the maximum or minimum value (step S16, S26).

Figure 4:
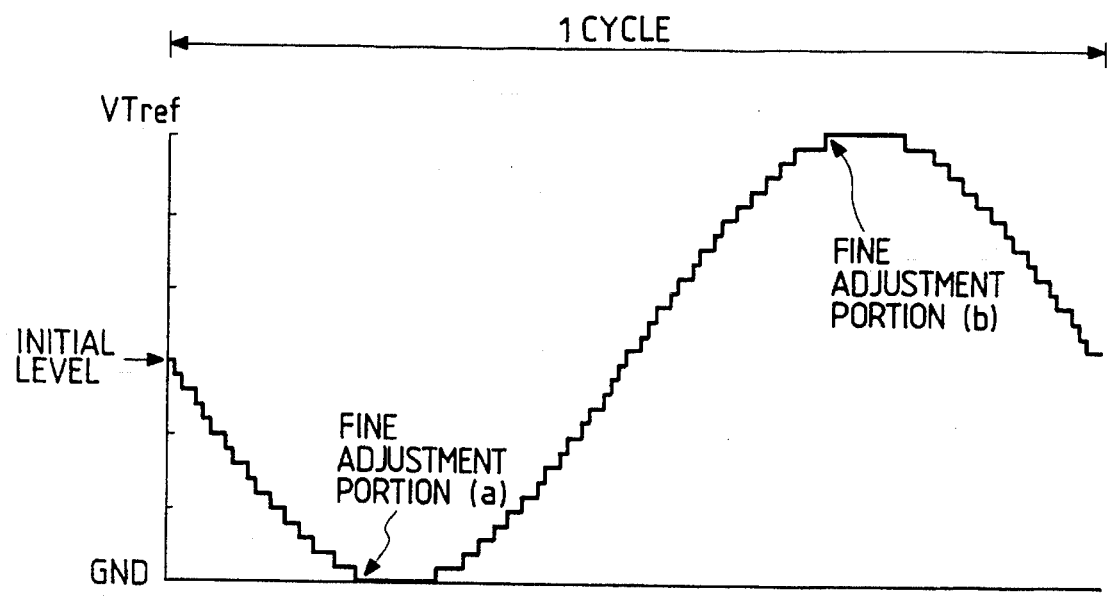
FIG. 4 is a waveform diagram showing one example output waveform produced by the tone signal wave forming circuit in the embodiment of the invention.

When as shown in FIG. 4, the output value (digital value) of the increment/decrement circuit 123 is maximum or minimum, the level is maintained for an additional period of one-half the [minor adjustment register value×clock signal $\phi_2$ period] to perform fine adjustment of frequency. The reason that the time duration in which the level is maintained is one-half the [minor adjustment register value×clock signal $\phi_2$ period] is because the fine adjustment is performed two times in one period or cycle (i.e. minor adjustment (a) and (b)) when the tone signal waveform output from the external tone output terminal TONEM is a sine wave.

Further, when the output value (digital value) of the increment/decrement circuit 123 reaches the maximum (or minimum), the direction of change in the output value (digital value) of the increment/decrement circuit 123 is switched, i.e. the operation of the increment/decrement circuit 123 is switched from incrementing to decrementing (or from decrementing to incrementing).

In step S17, S27 the bit counter 120 is incremented to process the next 8-bit bit pattern and then it is checked whether the value of the bit counter 120 has reached the valid bit length (step S18, S28). If it is found that the value of the bit counter 120 has not reached the valid bit length, the processing returns to step S03 where the above-mentioned series of operations is repeated. On the other hand, if the value of the bit counter 120 is found to have reached the valid bit length (the bit pattern of one cycle of the waveform is output from the MTGRAM 121), the bit counter 120 is cleared (step S19, S29).

Next, the tone generator enable bit MTEN in the tone control register 111 is checked. If that bit is "1," the processing returns to step S03 where the above-mentioned series of operations is performed (step S20, S30). In step S20, S30 if the check of the contents of the tone generator enable bit MTEN has found that the tone generator enable bit MTEN is "0," the tone generation operation is stopped.

In this embodiment, while the setting of the tone control register 111 can be carried out irrespective of the output timing, the stopping of the tone signal wave forming circuit 110 is done immediately after the output of one cycle of waveform.

With the above operations performed, the tone signal wave forming circuit 110 of this embodiment produces an artificial staircase waveform simulating a sinusoidal analog wave, as shown in FIG. 4, and outputs it from the external tone output terminal TONEM. One step of the staircase waveform is produced by dividing the reference clock signal $\phi_0$ supplied from the clock generator 130 by the prescaler 113 and counting the divided clock signal $\phi_1$ by the frame counter 114 up to the setting value of the frame register 112. That is, one step duration is expressed as [1 period of clock signal $\phi_1$×frame register value]. The total number of steps is specified by the valid bit length (value of the valid bit length register 119). In this way, it is possible to output signals of various frequencies and waveforms.

The output frequency is determined by the count value of the frame counter 114 and the value of the valid bit length register 119. By using the minor adjustment counter 116, the output frequency can be fine-adjusted.

In this embodiment, the fine adjustment can be done even at the point where the output level becomes maximum or minimum. As a result, it is possible to perform fine adjustments at points in the output waveform, such as a sine wave, where the waveform change is moderate, minimizing waveform distortions caused by fine adjustments. The fine adjustment of the output frequency may be performed when the value of the bit counter 120 becomes a certain value other than the maximum or minimum value.

FIG. 5 is a waveform diagram with the fine adjustment portion (a) of FIG. 4 shown enlarged. In the figure, the period designated Ts (time duration) represents a one-step duration. The period denoted Δt (minor adjustment time) is the additional time used for fine adjustment, This fine adjustment time Δt is expressed as [1 cycle of clock signal φ₂×value of minor adjustment register] divided by 2.

The output value of the increment/decrement circuit 123 is updated or held for each step (Ts). In FIG. 5, the binary "1" of the bit pattern corresponds to the updating of the increment/decrement circuit 123 and "0" corresponds to the holding of the value.

Figure 8:
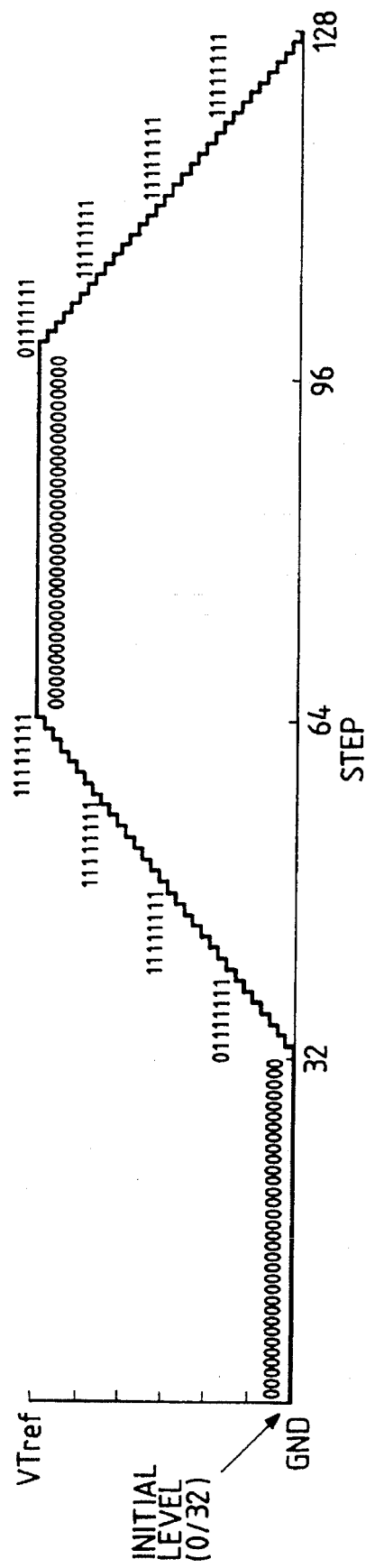
FIG. 8 is a waveform diagram showing an example output waveform (trapezoidal wave) in the embodiment of the invention.

FIG. 6 to FIG. 8 show example waveforms of one cycle. Waveforms in FIGS. 6 to 8 are produced when the value of the valid bit length register 119 is set to "128" and the amplitude is set at 0 V to 6 V. The value of the 5-bit initial level register 118 is set at "15" in decimal notation in the case of FIG. 6 and, in FIG. 7 and 8 it is set at "0" in decimal notation.

In this embodiment, a total of 32 steps of voltage, which are obtained by dividing a voltage between 0 V and 6 V into 31 equal parts, can be output from the external tone output terminal TONEM. For example, when the output value of the increment/decrement circuit 123 is "0" in decimal notation, a voltage of (0/31)×6=0 V is output from the external tone output terminal TONEM; and when the output value of the increment/decrement circuit 123 is "31" in decimal notation, a voltage of (31/31)×6=6 V is output from the external tone output terminal TONEM. Hence, if the value of the initial level register 118 is "0" in decimal notation, the voltage output from the external tone output terminal TONEM when the operation starts (the initial level) is 0 V; and if the initial level register value is "15" in decimal notation, the voltage output from the external tone output terminal TONEM at the start of operation is (15/31)×6=2.9 V.

In the figure "10111011" indicates a bit pattern written into the MTGRAM 121. The reason that the bit pattern is shown in 8 bits as a group in the figure is that they are read into the shift register 122 8 bits at a time.

As shown in FIG. 6 to 8, since the change in the output value of the increment/decrement circuit 123 is specified by the bit pattern written in the MTGRAM 121, it is possible to produce waveforms of arbitrary shapes, not just sine waves but triangular and trapezoidal waves, by setting appropriate bit patterns in the MTGRAM 121.

Next, another embodiment of this invention will be described by referring to FIG. 9.

This embodiment includes a circuit that produces an interrupt signal IRQ every half cycle and provides dual ports to the MTGRAM 121 of the first embodiment to enable rewriting the bit pattern at an arbitrary time. The RAM 121 is divided into a first half and a second half so that when the CPU 101 receives the interrupt signal IRQ, the bit pattern data in the non-read half is written over every half cycle. Therefore, if this embodiment is applied to a pulse generation circuit in communications equipment such as an MSK modem, it is possible to control the output waveform in each cycle. The circuit that produces the interrupt signal IRQ every half cycle may preferably be provided in the bit counter 120.

FIG. 9(a) is a timing diagram showing an example control of transmission wave in data communications between parent and child telephone sets according to the MSK modem 1200 bps standard. In the MSK modem standard, the transmission time of one data is 833 μsec and it is agreed that the transmission data with frequency of 1200 Hz represents data "1" and that with 1800 Hz represents data "0." According to this standard, let us consider in the following the method of controlling the transmission wave when sending transmission data "1," "0," "1," "0," "0," and "1" from a parent to a child telephone set.

First, the first-half data a and the second-half data b representing a sine wave of 1200 Hz is set in the MTGRAM 121. Next, the tone signal wave forming circuit 110 is started to output a sine wave of 1200 Hz representing data "1" according to the information (data a) recorded in the first-half of the MTGRAM 121. Next, according to the information (data b) recorded in the second-half of the MTGRAM 121, a sine wave of 1200 Hz representing data "1" is output. At this time, since the information (data a) recorded in the first-half of the MTGRAM 121 is already used, the. CPU 101 is responsive to the interrupt signal IRQ generated from the bit counter 120 to set data "0" (data c) representing a sine wave of 1800 Hz in the first-half of the MTGRAM 121. In parallel with this setting processing, a sine wave of 1200 Hz representing data "1" is output according to the data b in the second-half of the MTGRAM 121. This is followed by a sine wave of 1800 Hz, which represents the data "0", being output according to the data c set in the first-half of the MTGRAM 121.

With the above-mentioned operations repeated in succession, signals having frequencies representing the transmission data "1," "0," "1," "0," "0," and "1" can be output successively. In this way, because the MTGRAM 121 is dual-ported and divided into the first- and second-half, it is possible to write data in the second-half of the MTGRAM 121 while the first-half is being read out and to write data in the first-half while the second-half is being read out. As a result, the MTGRAM 121 can be effectively utilized, allowing reduction in the chip area.

While in the above explanation sine waves of 1200 Hz and 1800 Hz are output in an arbitrary sequence by rewriting the information recorded in the MTGRAM by the CPU 101, it is possible to output sine waves of 1200 Hz and 1800 Hz in a desired sequence by rewriting the value of the frame register 112 without rewriting the wave formation information in the MTGRAM 121. It is also possible to output sine Waves of 1200 Hz and 1800 Hz in a desired sequence by rewriting both the value of the valid bit length register 119 and the wave formation information in the MTGRAM 121. Furthermore, the sine waves of 1200 Hz and 1800 Hz can be output in a desired sequence by rewriting all three data—the frame register 112, the valid bit length register 119 and the wave formation information in the MTGRAM 121.

FIG. 9(b) shows the structure of a transmission signal used in exchanging information between a parent and a child or base and portable telephone set according to the MSK modem standard. When, for example, the parent telephone set transmits information to the child set, the first 12 bits of the transmission signal are allocated as a bit synchronous signal and the next 12 bits as a frame synchronous signal. The bit synchronous signal and the frame synchronous signal enable the communication between the parent and child sets, preparing the child set to receive the succeeding signals.

Next, the parent set sends out a 37-bit calling signal. When there are two or more child sets, the parent set puts in the calling signal an ID code dedicated to a child set to be called. It is also possible to assign a specified bit in the calling signal as a signal for error correction of the transmission signal. In this way, by means of a series of signals made up of 65 bits in all, the parent set can select a desired child set for communication.

The bit synchronous signal and the frame synchronous signal have flexibility in coping with a situation where the applicable standard is changed, by changing the number of their bits easily. The number of bits in the calling signal may be changed arbitrarily according to the number of child sets or to the amount of information to be transmitted.

Figure 18:
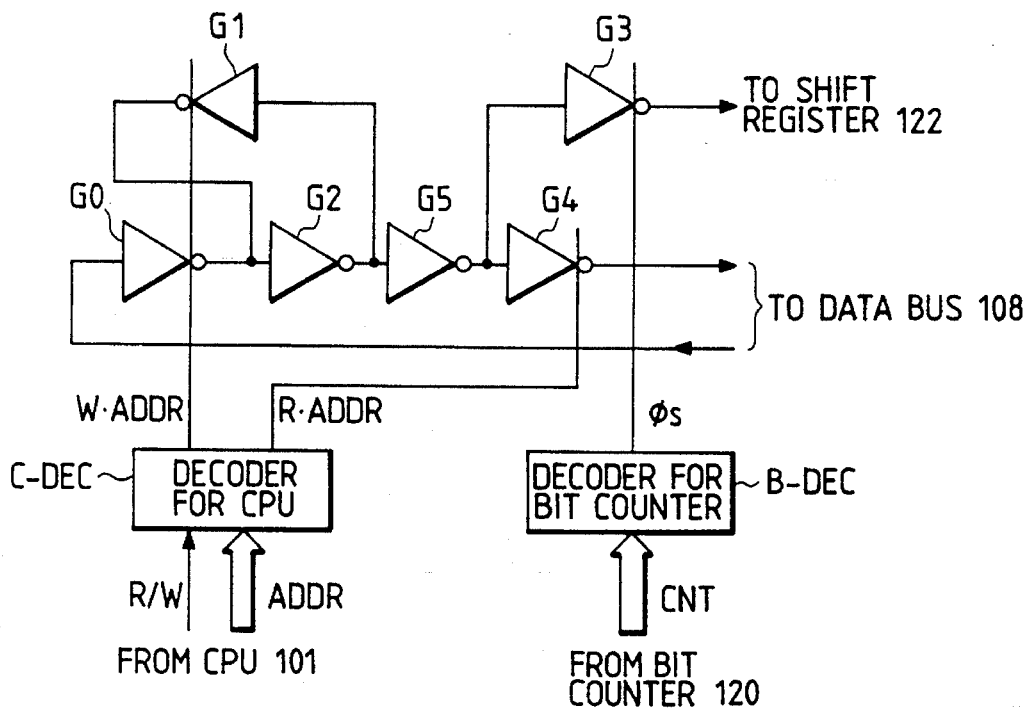
FIG. 18 is a diagram showing an example logic configuration of a memory cell when MTGRAM 121 is made a dual port.

FIG. 18 shows an example circuit configuration of a memory cell of the dual-ported MTGRAM 121. The memory cell of FIG. 18 may be used as a memory cell of the MTGRAM 121 of FIG. 2.

Each memory cell comprises: a data latch section made up of a clocked inverter G1 and an ordinary inverter G2 so arranged that the output signal of each inverter is applied to the input terminal of the other; an input clocked inverter G0; two output clocked inverters G3, G4; and an inverter G5 for polarity alignment. Of the output clocked inverters G3, G4, the output clocked inverter G3 has its output terminal connected to the data input terminal of the shift register 122 of FIG. 2 and the output clocked inverter G4 has its output terminal connected to the data bus 108. The input terminal of the input clocked inverter G0 is connected to the data bus 108. With this arrangement, each memory cell has one input port and two output ports.

The dual-ported MTGRAM 121 is also provided with a CPU side decoder C-DEC which decodes the address signal ADDR supplied from the CPU 101 through the address bus 107 and with a shift register side decoder S-DEC which decodes the count value supplied from the bit counter 120.

The CPU side decoder C-DEC, according to the read/write control signal R/W and the address signal ADDR supplied from the CPU 101, forms a selection signal W·ADDR for controlling the input clocked inverter G0 and a selection signal R·ADDR for controlling the output clocked inverter G4. The shift register side decoder SDEC decodes four higher-order bits of the count value to form a selection signal $\phi_s$ for controlling the output clocked inverter G3.

Since each memory cell is provided with two output clocked inverters, the CPU side decoder C-DEC and the shift register side decoder S-DEC, it is possible with the MTGRAM 121 of this embodiment that in different memory cells the bit pattern can be read into the shift register 122 while allowing the CPU 101 to read it onto the data bus 108.

Writing data into the MTGRAM 121 by the CPU 101 involves producing an interrupt signal IRQ at each half-cycle from the bit counter 120 and causing the CPU 101 upon reception of the interrupt signal IRQ to write data into the half memory cell not being used for reading so as to prevent contention between reading and writing operations thus avoiding a trouble of the data being changed or lost during reading operation.

Figure 10:
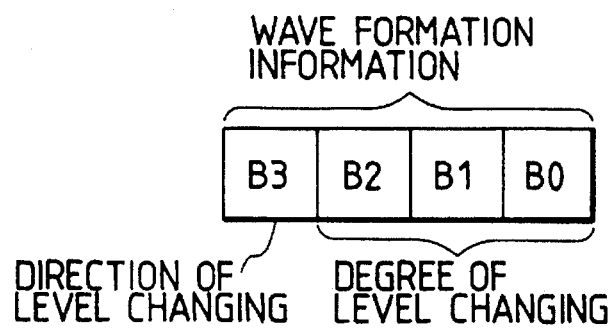
FIG. 10 is an explanatory diagram showing an example of bit configuration of the wave formation information in a further embodiment of the invention.

A further embodiment of this invention will be described by referring to FIG. 10.

In the preceding embodiment, the wave formation information of the output wave for each step is one bit. In this embodiment, however, the wave formation information consists of a plurality of bits. That is, as shown in FIG. 10, four bits are used for the wave formation information, with the highest bit B3 specifying the direction of the output level change and with the lower three bits B2–B0 specifying the amount of change in the output level (including the specification of output level keeping). In this embodiment, an addition/subtraction circuit is preferably used instead of the increment/decrement circuit 123 of the previous embodiment.

Figure 20:
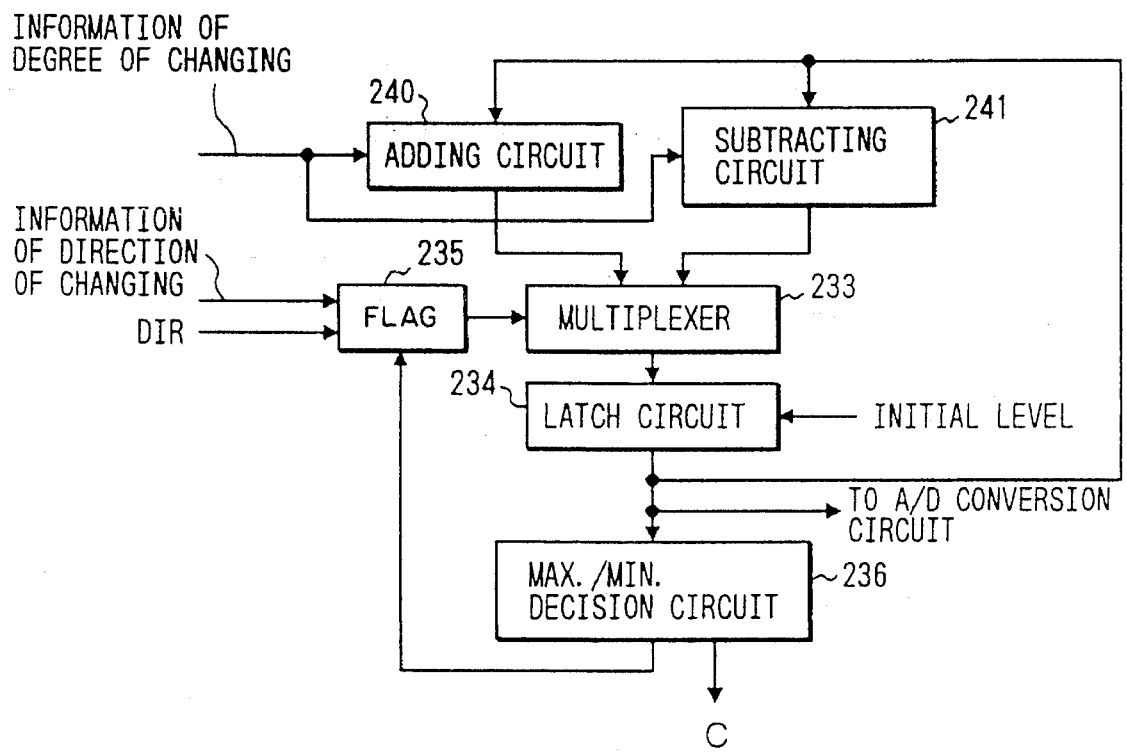
FIG. 20 is a block diagram showing the configuration of an addition/subtraction circuit.

FIG. 20 shows a block diagram of the addition/subtraction circuit, a digital calculation means. The addition/subtraction circuit of FIG. 20 has almost the same configuration as the increment/decrement circuit 123 of FIG. 19, so that only differing points will be explained below. Instead of the incrementer 231 and decrementer 232 of FIG. 19, FIG. 20 shows an adding circuit 240 and a subtracting circuit 241. The adding circuit 240 and the subtracting circuit 241 add and subtract a specified value to and from the digital value stored in the latch circuit 234 according to the information on amount of change stored in the lower three bits B2–B0 of the 4-bit wave formation information.

The up/down flag 235 may be supplied with the highest bit B3 of the 4-bit wave formation information or with information stored in the level change direction specification bit DIR in the tone control register 111.

The multiplexer 233, according to the information stored in the up/down flag 235, selects either added or subtracted value produced by performing calculation on the digital value stored in the latch circuit 234 according to the amount of change information. The selected value is written into the latch circuit 234.

Suppose that a digital value "10" in decimal notation is held in the latch circuit 234. In this condition, let us consider a case where wave formation information "1011" is entered into the adding/subtracting circuits 240, 241. The lower three bits of the wave formation information is "011." The adding circuit 240 adds "3" in decimal notation represented by the lower three bits of the wave formation information to the value "10" in decimal notation held in the latch circuit 234 and gives a resultant value "13" in decimal notation to the multiplexer 233. The subtracting circuit 241 subtracts "3" in decimal notation represented by the lower three bits of the wave formation information from the value "10" in decimal notation held in the latch circuit 234 and gives a resultant value "7" in decimal notation to the multiplexer 233. When the highest bit B3 of the wave formation information is "1" and this value is held in the up/down flag 235, the multiplexer 233 selects the value "13" in decimal notation from the adding circuit 240. A binary value corresponding to this decimal value "13" is then held in the latch circuit 234.

When the wave formation information is "0011," i.e. when the highest bit B3 of the wave formation information is "0" and the value of bits B2–B0 is the same as in the above-mentioned case, the multiplexer 233 selects the decimal value "7" output from the subtracting circuit 241 because the value held in the up/down flag 235 is "0." As a result, a binary data corresponding to the decimal value "7" is then held in the latch circuit 234.

While the four bits of the wave formation information have been described to form a unit, various modifications may be made. For instance, if the wave formation information is formed of five bits, the amount of change information is made up of four bits, so that the adding circuit 240 and the subtracting circuit 241 select one of the decimal values "0" to "15" and perform addition and subtraction on the digital value.

Figure 11:
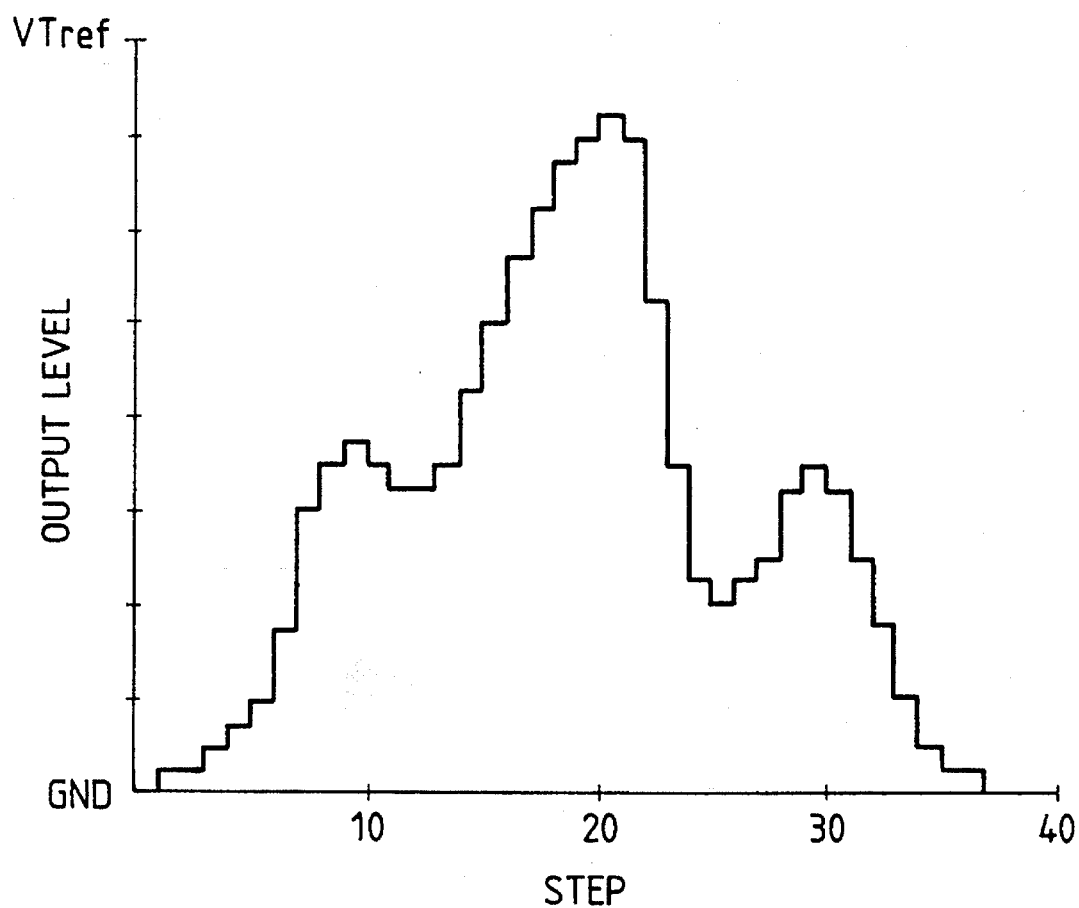
FIG. 11 is a waveform diagram showing one example output waveform (voice waveform) in the embodiment of FIG. 10.

In the preceding embodiment, since the wave formation information on the output wave for each step consists of one bit, the only specification that can be made for wave formation is keeping or updating of the output level. With this embodiment, however, it is possible to specify any one of eight levels of output change. Hence, by combining the method of this embodiment with the output wave control in each cycle, waveforms as complex as voice waves shown in FIG. 11 can be produced.

In the preceding embodiment, the output level at the start of operation is determined by supplying the value set in the initial level register 118 to the increment/decrement circuit 123. It is possible to provide the initial level register 118 within the increment/decrement circuit 123 and give the initial level directly from the internal data bus to the increment/decrement circuit 123.

In the foregoing embodiment, the shift register 122 is provided in addition to the bit counter 120 to successively read the wave formation information 8 bits at a time from the MTGRAM 121 that stores wave formation information on the output waveform, and then convert the read information into serial data by the shift register 122 thereby operating the increment/decrement circuit 123. It may be possible to omit the shift register 122 and read the wave formation information from the MTGRAM 121 1 bit at a time in succession to operate the increment/decrement circuit 123. Alternatively, the entire MTGRAM 121 may be formed of a single shift register.

Next, let us explain about an example application of a single-chip microcomputer incorporating the tone signal wave forming circuit of the preceding embodiment.

Figure 21:
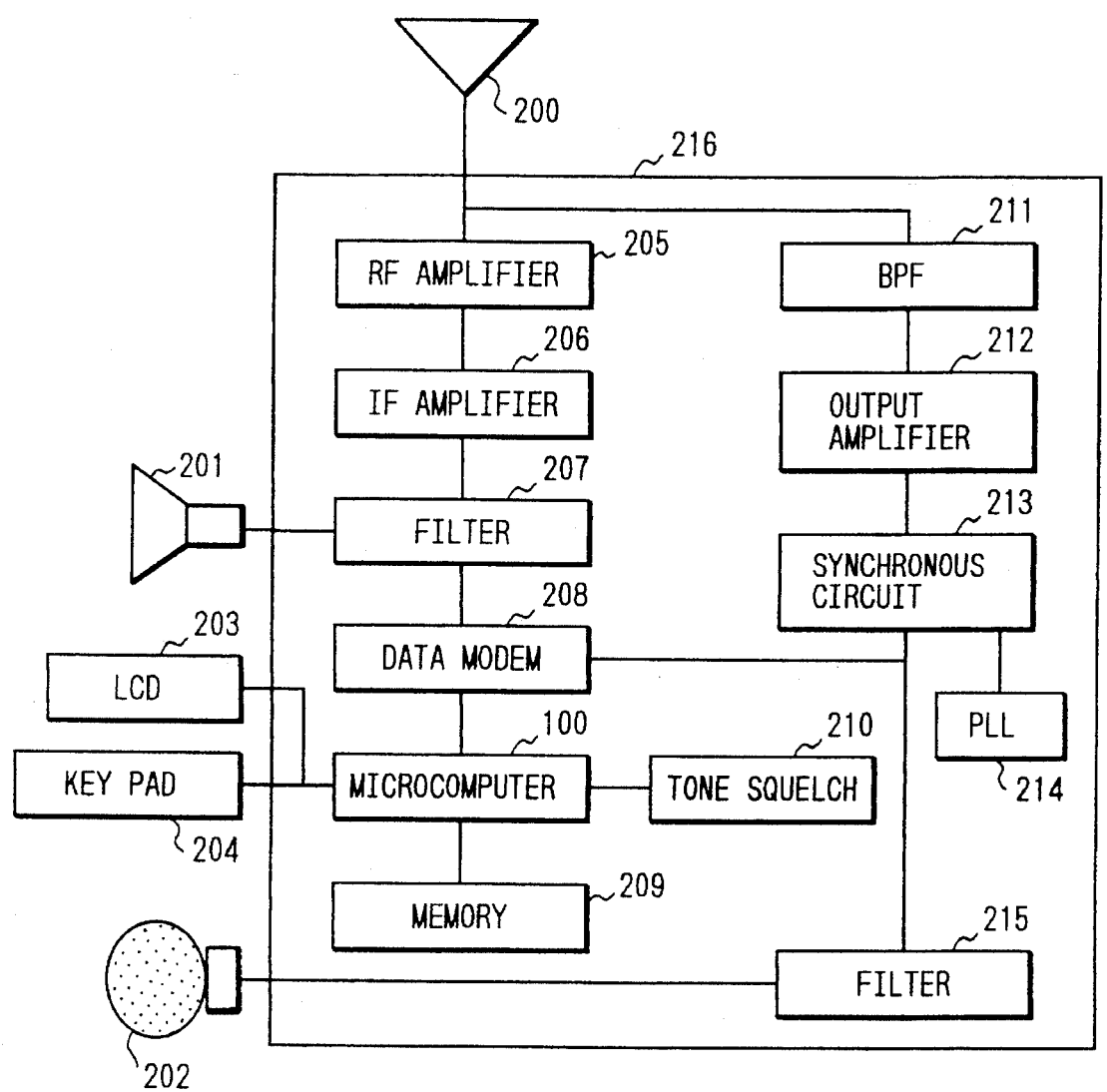
FIG. 21 is a block diagram showing the overall configuration of a system of radio equipment wherein a single-chip microcomputer incorporating the tone signal wave forming circuit of the invention is applied to the controller of the radio equipment.

FIG. 21 is a block diagram showing the overall configuration of a system in which the single-chip microcomputer 100 of FIG. 2 is applied to a controller of a radio equipment 216.

The signal received by an antenna 200 is amplified by an RF amplifier 205 and fed to an IF amplifier 206, from which it is passed through a filter 207 to be picked up as a voice signal by a speaker 201. A voice signal entered from a microphone 202 passes through a filter 215, a synchronous circuit 213, a PLL circuit 214, an output amplifier 212 and a band-pass filter 211 and is transmitted from the antenna 200.

The single-chip microcomputer 100 is connected to a key pad that specifies various controls such as volume adjustment of the voice signal output from the speaker 201 and on/off switch control of the radio equipment operation. The tone signal wave forming circuit 110 in the single-chip microcomputer 100 forms a frequency corresponding to the ID code of a destination radio equipment specified by the key pad 204 and sends the frequency to a data modem 208. This signal is passed through the synchronous circuit 213, output amplifier 212 and band-pass filter 211 and is transmitted from the antenna 200. The information supplied from the key pad 204 is stored in a memory 209 so that it can later be retrieved by the CPU in the single-chip microcomputer 100 for processing.

A tone squelch 210 has a function of preventing signals of other frequencies than the set frequency from being output from the speaker. Since the radio equipment incorporates the tone signal wave forming circuit of this invention that generates a frequency corresponding to the ID code of the destination radio equipment, it is possible to call up a particular radio equipment from among many equipments. Furthermore, since the tone signal wave forming circuit is built into the single-chip microcomputer, the number of semiconductor integrated circuit devices used in the radio equipment can be reduced, which in turn enables reduction in the size of the radio equipment itself and in the system cost.

As explained above, the wave forming circuit of the above embodiment includes a memory means to store the wave formation information on the output waveform, a digital value control means which has a digital value and which variably controls the digital value, and a digital/analog (D/A) conversion circuit which performs digital/analog conversion on the digital value, and which, according to the wave formation information stored in the memory means, controls the operation of the digital value control means to produce a desired wave<form. Hence, when the wave forming circuit is incorporated in the single-chip microcomputer, there is no need to provide control terminals dedicated for selecting an output waveform. This in turn allows the wave forming circuit (tone signal wave forming circuit) to be built into the single-chip microcomputer without increasing the number of terminals.

The wave forming circuit of this embodiment includes a first counting means for counting the clock signal up to a specified number (frame counter), and a second counting means (bit counter) for counting a signal output from the first counting means (frame counter). The second counting means (bit counter) is operated by the signal output from the first counting means (frame counter) and each time the second counting means (bit counter) counts up the specified number, the wave formation information stored in the memory means is repetitively read out. According to the wave formation information read out, the digital value control means is controlled to change the digital value. Therefore, with the arbitrary wave forming circuit of the embodiment, is possible to produce a waveform signal of a desired frequency by changing the value to be counted by the first counting means (frame counter).

Since the one-step wave formation information for generating an output waveform is 1-bit information specifying either keeping or updating (increase or reduction) of the count value of the increment/decrement circuit—which forms the digital value control means, it is possible to minimize the wave formation information. This in turn allows reduction in the capacity of the memory means (MTGRAM), enhancing the efficiency of memory use.

The present invention accomplished by the inventors has been described in detail in conjunction with example embodiments. It is noted that this invention is not limited to these embodiments various modifications may be made without departing the spirit of the invention. For example, in the above embodiments, the tone control register 111 specifies whether the increment/decrement circuit 123 first counts up or counts down. Alternatively, it is possible to arrange the circuit so that the increment/decrement circuit will always start counting up (or counting down) whenever the tone signal wave forming circuit is started.

It is also possible to write into a specified bit in the tone control register 111 to cause the D/A conversion circuit 124 to directly D/A-convert the signal on the internal data bus 108.

The valid bit length register 119 and the bit counter 120 may be omitted and the wave formation information stored in the MTGRAM 121 may all be read out each time to form an output wave.

In the above description, while we have focused mainly on a case where this invention is applied to the tone signal wave forming circuit built into the single-chip microcomputer, a field of application from which this invention has originated, it is noted that this invention is not limited to this application alone. The invention can widely be applied to circuits that control communication complying with such standards as CTCSS (sub-audio tone squelch system), SELCALL (selective-call) and 5-tone selective-call in radio equipment.

Representative advantages of this invention may be briefly summarized as follows.

By writing the wave formation information on the output waveform into a memory means, it is possible to generate a wave of any desired waveform. Because no additional dedicated control terminals are required, the tone signal wave forming circuit can easily be incorporated into the single-chip microcomputer.

Furthermore, by changing the wave formation information stored in the memory means, it is possible to produce a signal of any desired frequency.

What is claimed is:

1. A method of transmitting information by using a first signal of an arbitrary waveform at an arbitrary frequency and a second signal different from the first signal, the method comprising the steps of:

writing first waveform data for the first signal into a memory;

setting a predetermined value specifying a last address of the memory to be used into a register;

accessing the memory by an address generating circuit successively and repeatedly generating address signals which are included in an address range defined as between a start address of the memory and the last address of the memory specified by the predetermined value, wherein the accessing step includes:

1) reading out a first half of the first waveform data by accessing a first half of the address range, 2) after the step 1), writing a first half of a second waveform data for the second signal in the first half of the address range while reading out a second half of the first waveform data by accessing a second half of the address range, 3) after the step 2), writing a second half of the second waveform data for the second signal in the second half of the address range while reading out the first half of the second waveform data by accessing the first half of the address range, and 4) after the step 3), reading out the second half of the second waveform data by accessing the second half of the address range; and outputting the first signal based on the first waveform data read out by the steps 1) and 2) and the second signal based on the second waveform data read out by the steps 3) and 4).

2. The method according to claim 1, wherein the outputting step further includes the steps of:

receiving the first and the second waveform data read out by the steps 1) to 4) in series to increment or decrement a digital value stored in a latch circuit in accordance with a value of the respective bits of the first and second waveform data read out by the steps 1) to 4); and converting the digital value which is incremented or decremented in the latch circuit into an analog signal to output the first signal or the second signal.

3. The method according to claim 1, wherein the accessing step further includes the steps of:

5) writing the first half of the first waveform data for the first signal in the first half of the address range while executing the step 4), 6) after the step 5), writing the second half of the first waveform data for the first signal in the second half of the address range while reading out the first half of the first waveform data by accessing the first half of the address range, and 7) after the step 6), reading out the second half of the first waveform data by accessing the second half of the address range.

4. The method according to claim 1, wherein the accessing step further includes the step of generating an interrupt signal from the address generating circuit to a central processing unit each time the memory outputs the data from the first half or second half thereof, thereby allowing the central processing unit to execute the writing operation in the steps 2) and 3).

5. A method of communicating information between a base and a portable telephone set according to an MSK modem by using a first signal of a sine wave at 1200 Hz and a second signal of a sine wave at 1800 Hz, the first signal representing mark data, the second signal representing space data, the method comprising the steps of:

writing first waveform data for the first signal into a memory;

setting a predetermined value specifying a last address of the memory to be used into a register;

accessing the memory by an address generating circuit successively and repeatedly generating address signals which are included in an address range defined as between a start address of the memory and the last address of the memory specified by the predetermined value, wherein the accessing step includes:

1) reading out a first half of the first waveform data by accessing a first half of the address range, 2) after the step 1), writing a first half of a second waveform data for the second signal in the first half of the address range while reading out a second half of the first waveform data by accessing a second half of the address range, 3) after the step 2), writing a second half of the second waveform data for the second signal in the second half of the address range while reading out the first half of the address range of the second waveform data by accessing the first half of the address range, 4) after the step 3), reading out the second half of the second waveform data by accessing the second half of the address range: and outputting the first signal based on the first waveform data read out by the steps 1) and 2) and the second signal based on the second waveform data read out by the steps 3) and 4).

6. The method according to claim 5, wherein the outputting step further includes the steps of:

receiving the first and the second waveform data read out by the steps 1) to 4) in series to increment or decrement a digital value stored in a latch circuit in accordance with a value of respective bits of the first and second waveform data read out by the steps 1) to 4); and converting the digital value which is incremented or decremented in the latch circuit into an analog signal to output the first signal or the second signal.

7. The method according to claim 5, wherein the accessing step further includes the step of:

5) writing the first half of the first waveform data for the first signal in the first half of the address range while executing the step 4);

6) after the step 5), writing the second half of the first waveform data for the first signal in the second half of the address range while reading out the first half of the first waveform data by accessing the first half of the address range; and 7) after the step 6), reading out the second half of the first waveform data by accessing the second half of the address range.

8. The method according to claim 5, wherein the accessing step further includes the step of generating an interrupt signal from the address generating circuit to a central processing unit each time the memory outputs the data in the first half or the second half thereof, thereby allowing the central processing unit to execute the writing operation in the steps 2) and 3).

* * * * *